United States Patent
Gullander

(10) Patent No.: US 11,030,879 B2
(45) Date of Patent: Jun. 8, 2021

(54) ENVIRONMENT-AWARE MONITORING SYSTEMS, METHODS, AND COMPUTER PROGRAM PRODUCTS FOR IMMERSIVE ENVIRONMENTS

(71) Applicant: Sony Mobile Communications Inc., Tokyo (JP)

(72) Inventor: Anders Gullander, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/343,546

(22) PCT Filed: Nov. 22, 2016

(86) PCT No.: PCT/JP2016/084661
§ 371 (c)(1),
(2) Date: Apr. 19, 2019

(87) PCT Pub. No.: WO2018/096599
PCT Pub. Date: May 31, 2018

(65) Prior Publication Data
US 2019/0333361 A1 Oct. 31, 2019

(51) Int. Cl.
*G08B 21/22* (2006.01)
*G06T 11/00* (2006.01)
(52) U.S. Cl.
CPC .............. *G08B 21/22* (2013.01); *G06T 11/00* (2013.01)
(58) Field of Classification Search
CPC ....... G06T 11/00; G06T 19/006; G08B 21/22; G06F 3/011; G06F 3/012; G06F 3/0346;
(Continued)

(56) References Cited

U.S. PATENT DOCUMENTS

2015/0339905 A1* 11/2015 Stevens .................. G08B 21/02
340/4.1
2016/0078278 A1* 3/2016 Moore ............... G06K 9/00201
345/8
(Continued)

FOREIGN PATENT DOCUMENTS

| EP | 0772790 | 3/2002 |
|----|---------|--------|
| GB | 2524269 | 9/2015 |
| WO | 9637798 | 11/1996 |

OTHER PUBLICATIONS

PCT International Search Report dated Apr. 18, 2017 for corresponding International Application No. PCT/JP2016/084661 (4 pages).

(Continued)

*Primary Examiner* — Jennifer Mehmood
*Assistant Examiner* — Andrew Shin
(74) *Attorney, Agent, or Firm* — Myers Bigel, P.A.

(57) ABSTRACT

Methods and systems for monitoring an immersive system include detecting a first event that occurs in an environment of a user of the immersive system that is external to an immersive headset of the immersive system while the user is operating the immersive system, initiating monitoring of the environment of the user of the immersive system responsive to detecting the first event, detecting a second event that occurs in the environment of the user of the immersive system that is external to the immersive headset while monitoring the environment of the user of the immersive system, and, responsive to determining that the second event matches a defined pattern, providing an indication to the user of the immersive system so that the user is alerted.

22 Claims, 14 Drawing Sheets

(58) Field of Classification Search
CPC .... G06F 2203/012; G06F 3/017; G06F 3/167; G06F 3/04815; G06F 3/165; G02B 27/017; G02B 27/0093; G02B 2027/0138; G02B 2027/0187; G02B 2027/014; G02B 2027/0178

See application file for complete search history.

(56) References Cited

U.S. PATENT DOCUMENTS

| | | |
|---|---|---|
| 2016/0124502 A1 | 5/2016 | Sawyer |
| 2016/0182613 A1* | 6/2016 | Brune .................... H04L 67/10 709/217 |
| 2016/0207457 A1 | 7/2016 | Border |
| 2016/0209658 A1 | 7/2016 | Zalewski |
| 2016/0313790 A1 | 10/2016 | Clement |

OTHER PUBLICATIONS

PCT Written Opinion dated Apr. 18, 2017 for corresponding International Application No. PCT/JP2016/084661 (9 pages).

* cited by examiner

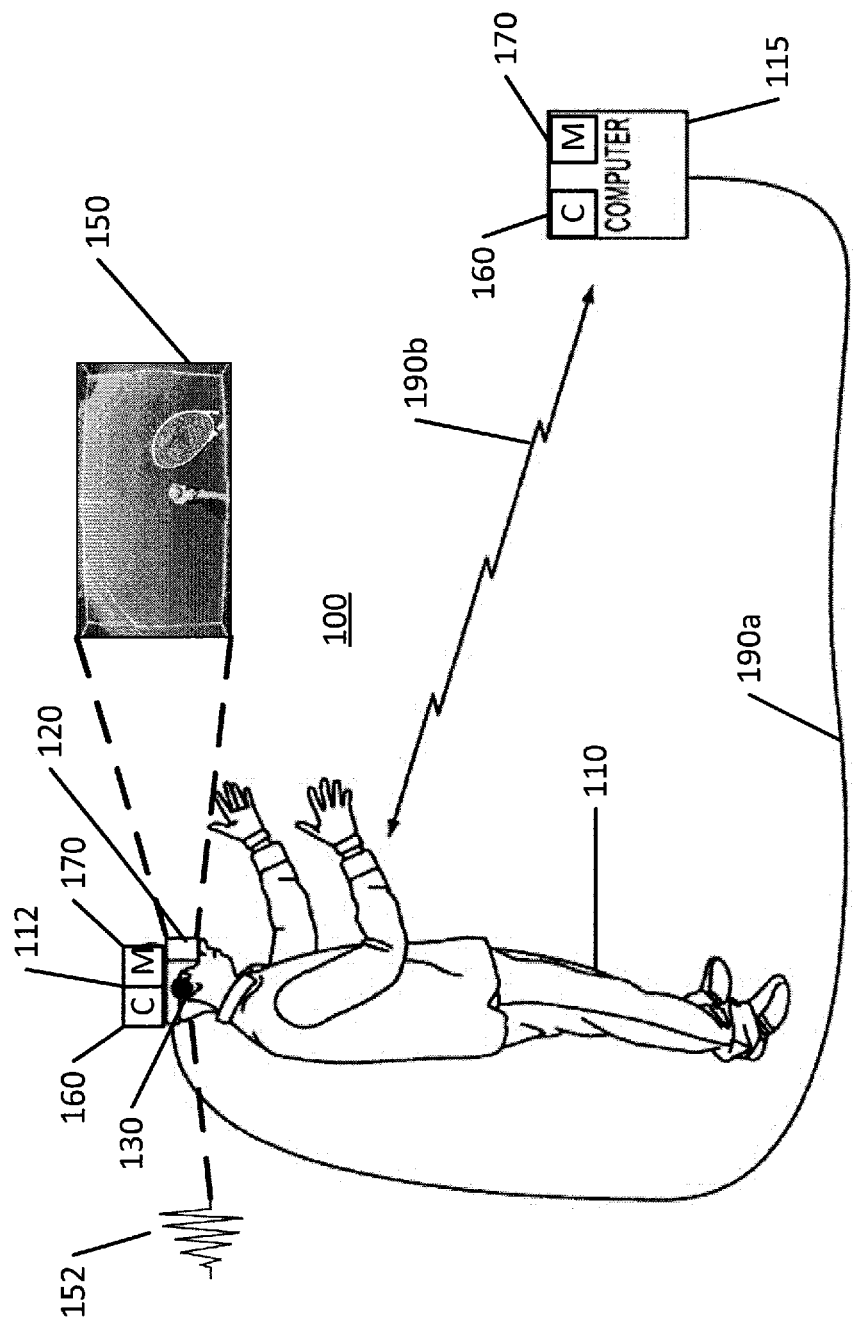
[Fig. 1A]

[Fig. 1B]
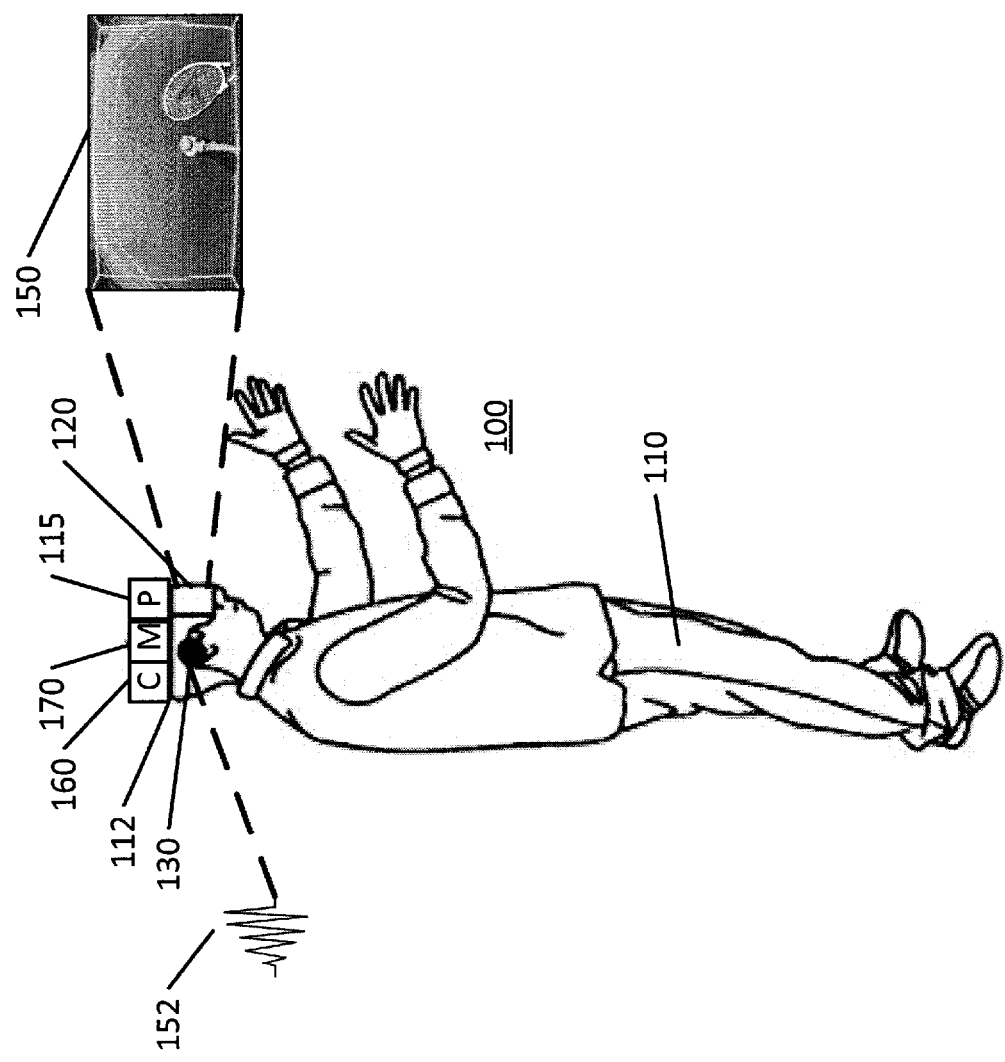

[Fig. 2]
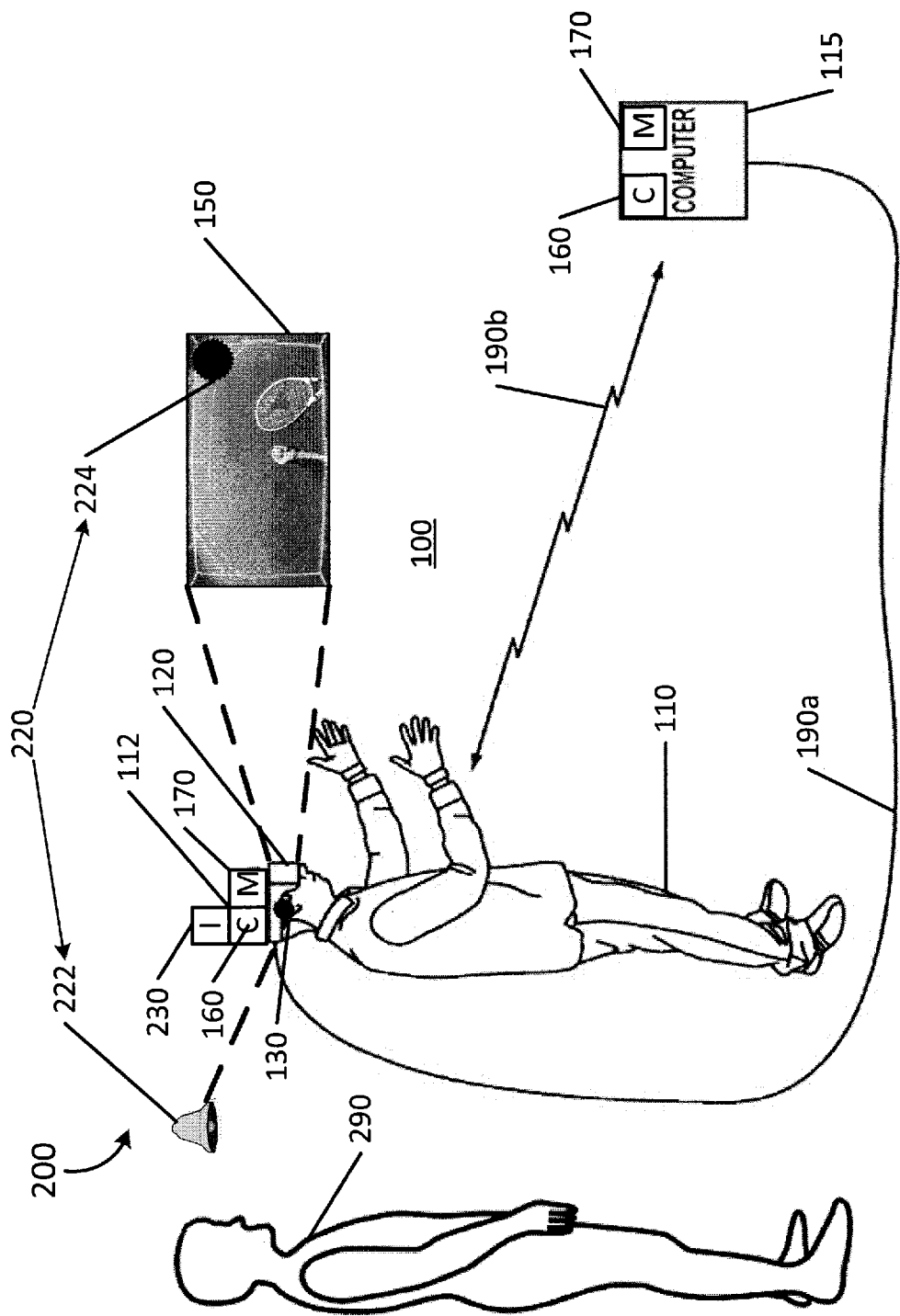

[Fig. 3]
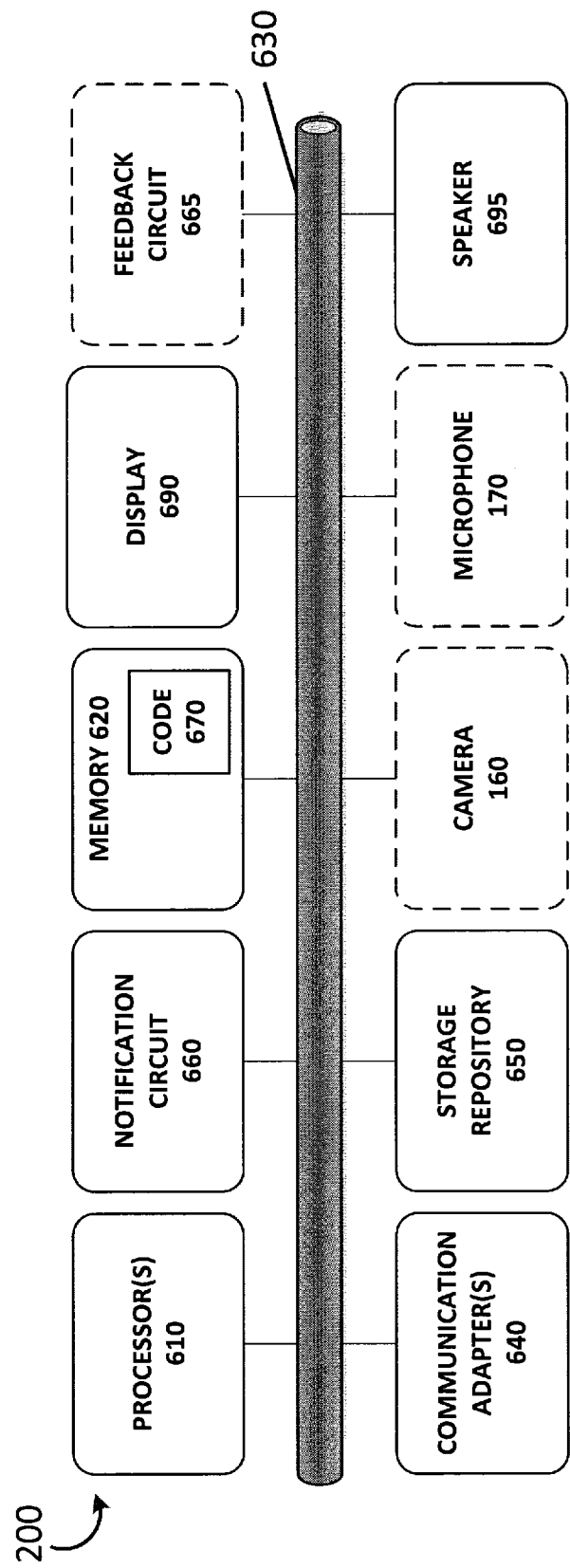

[Fig. 4]
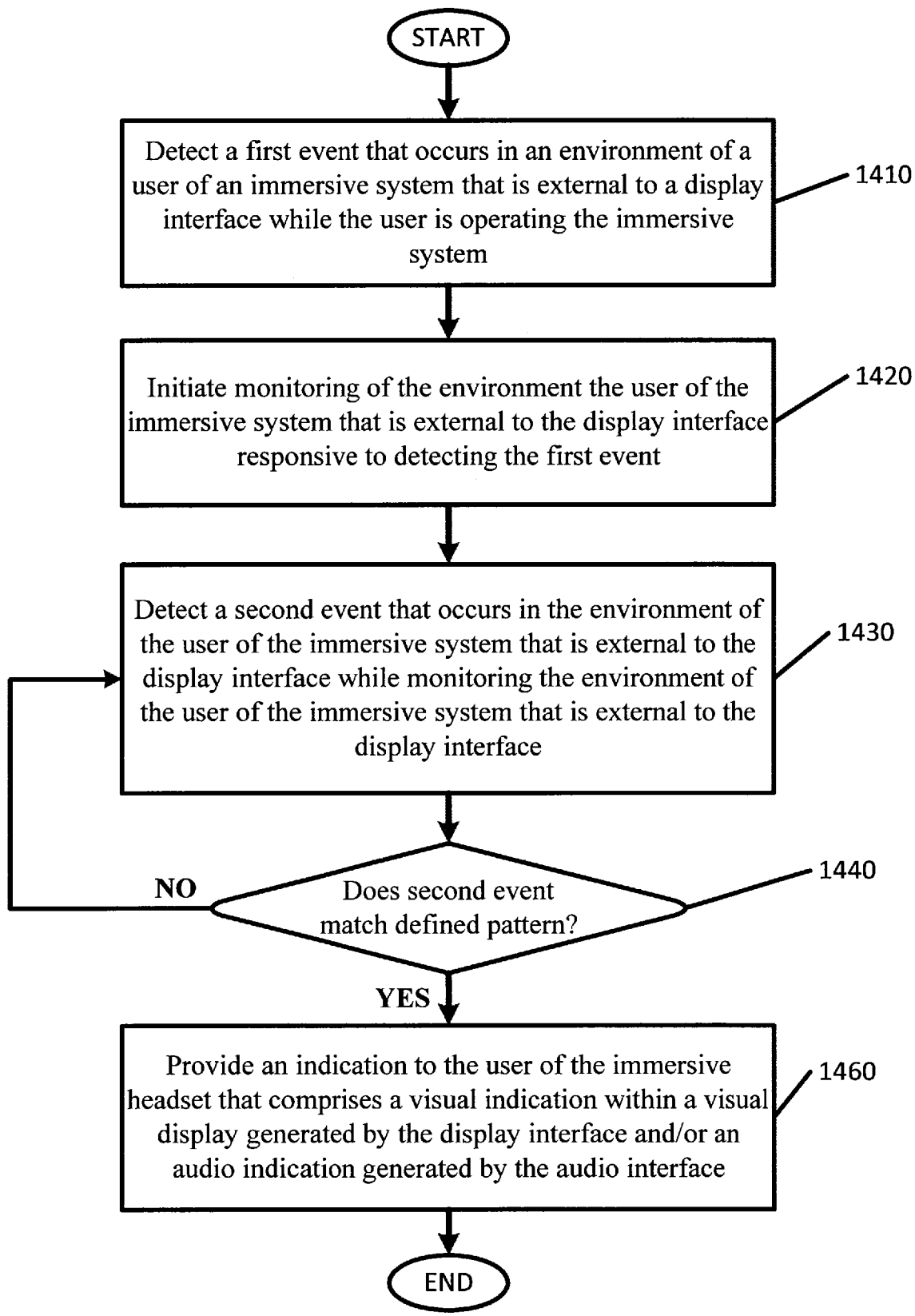

[Fig. 5]
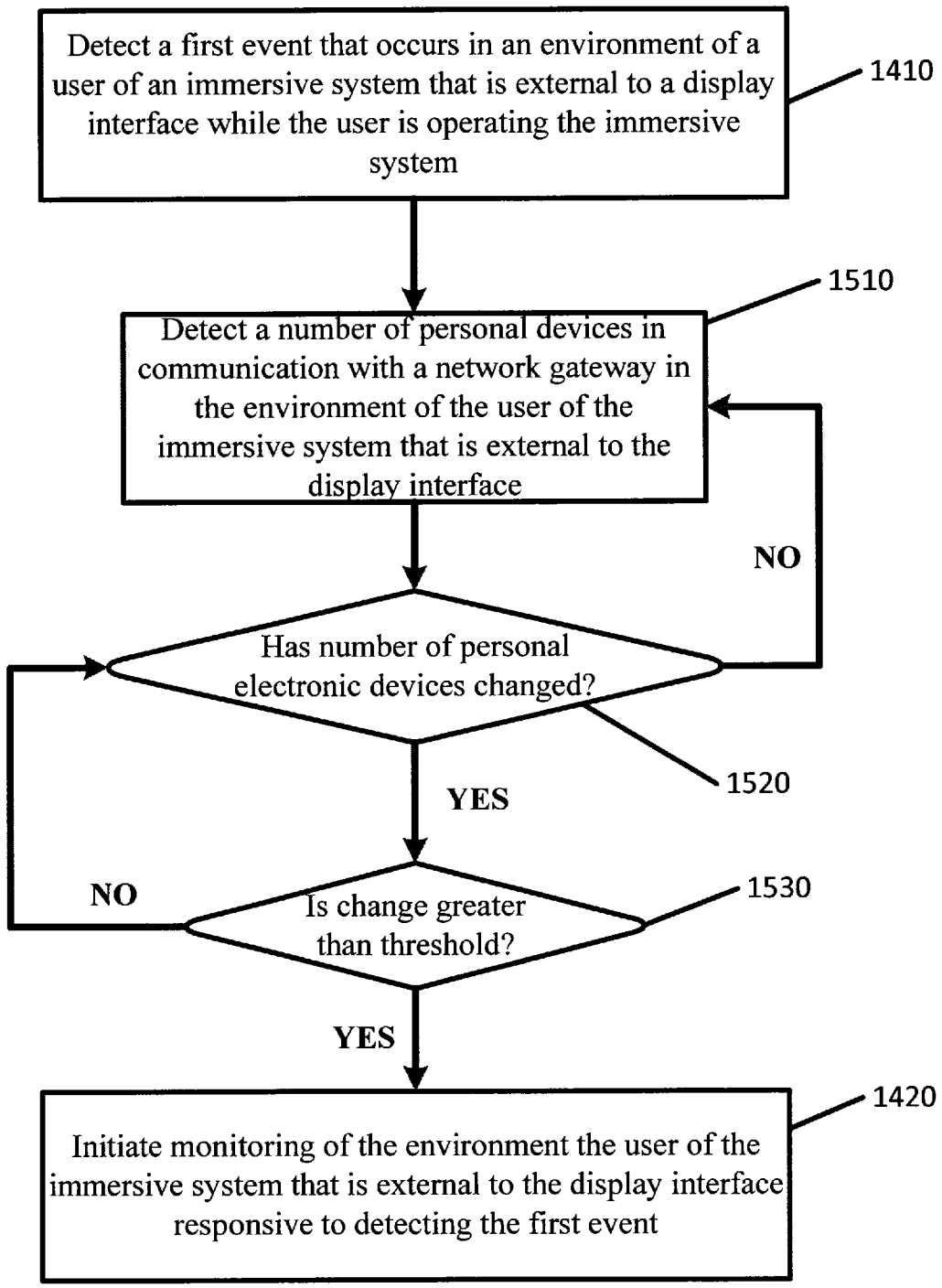

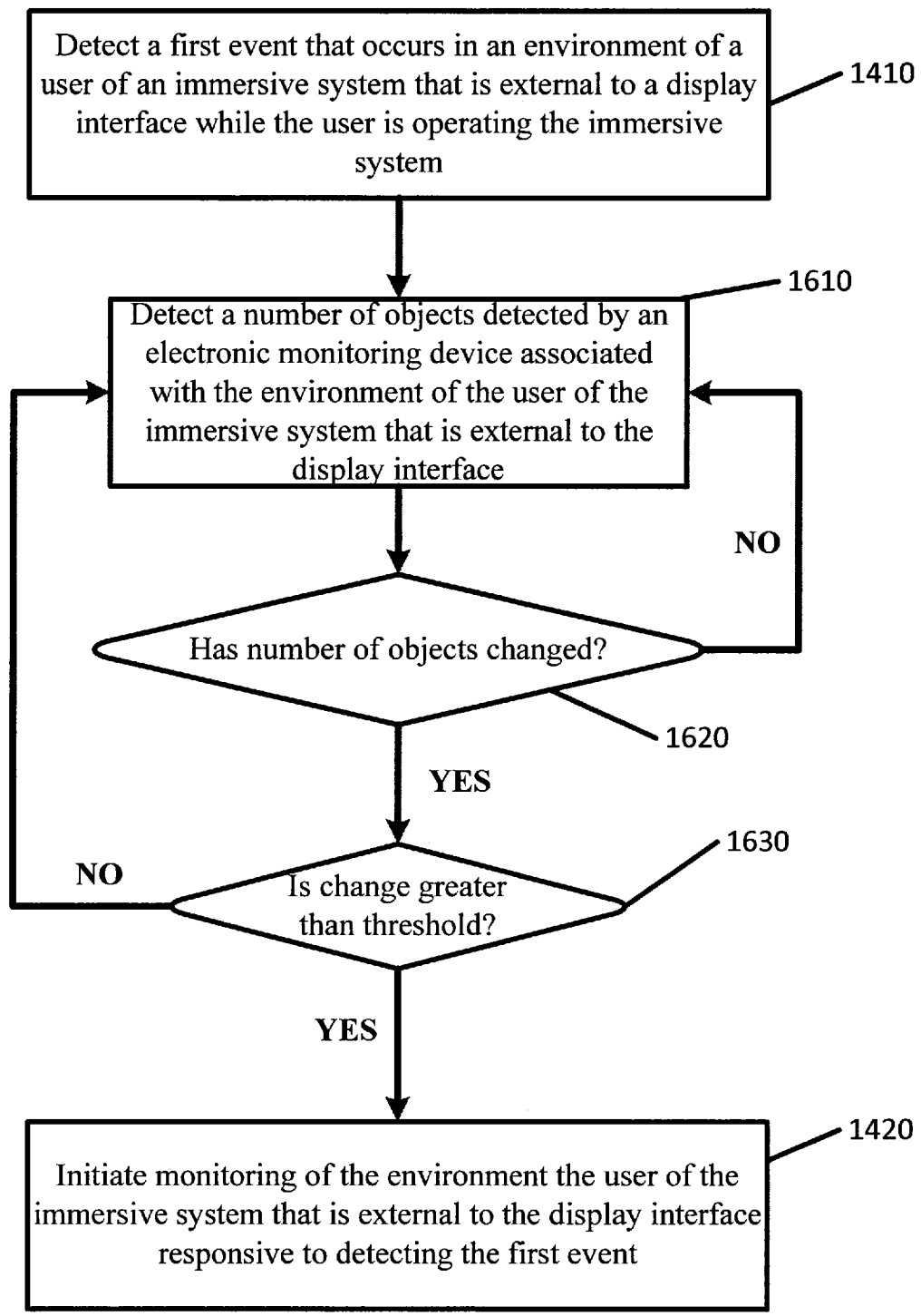
[Fig. 6]

[Fig. 7]
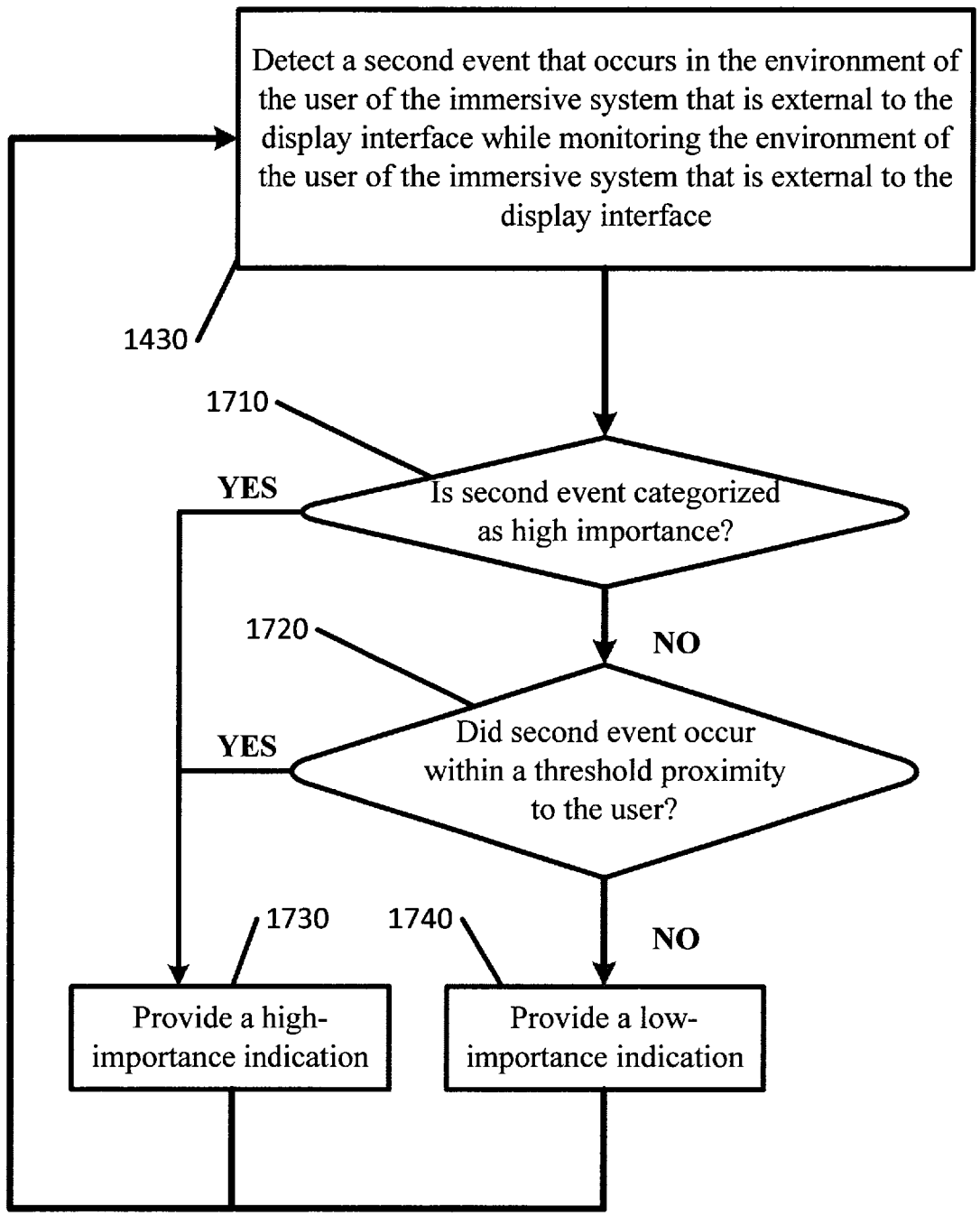

[Fig. 8A]
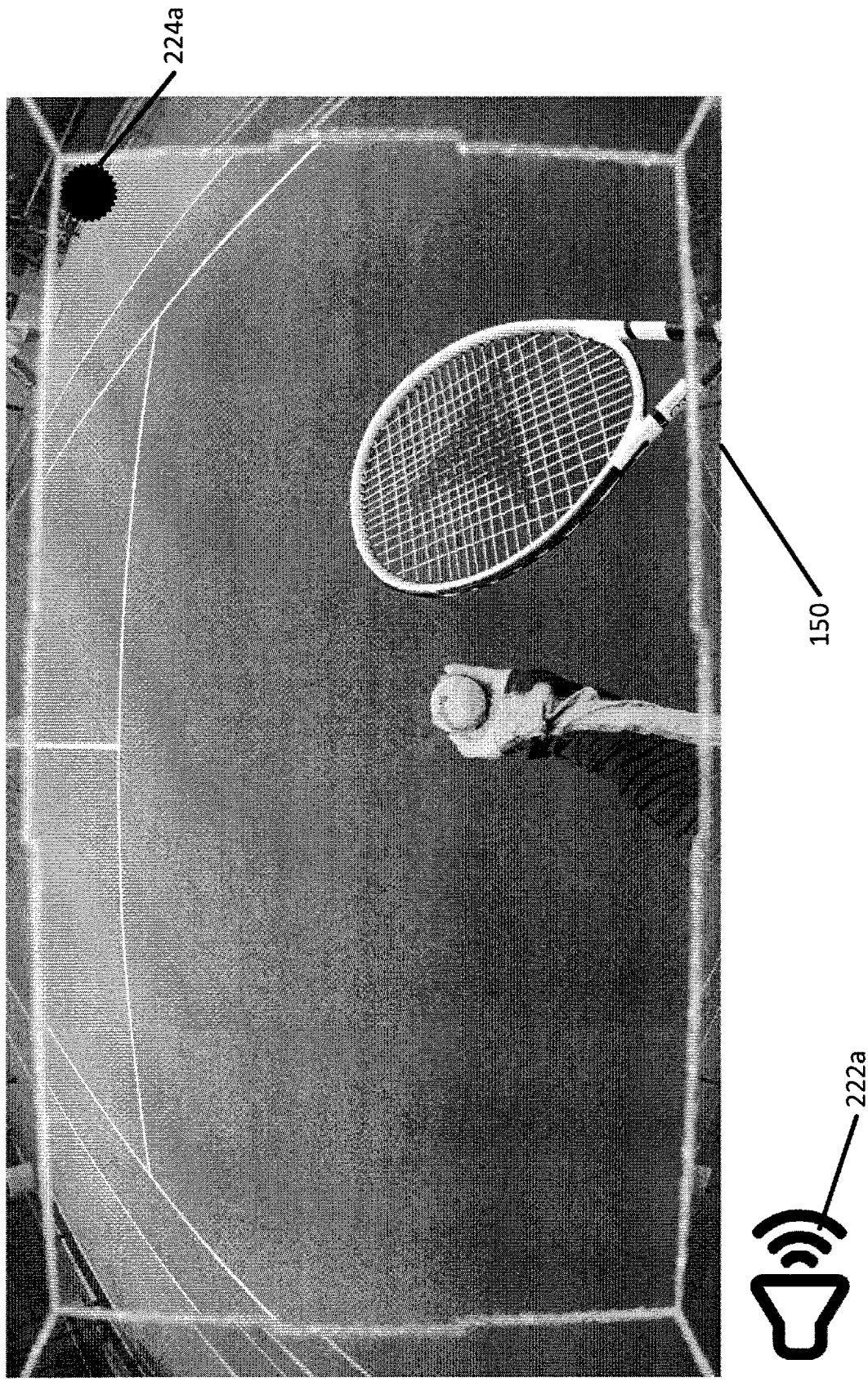

[Fig. 8B]
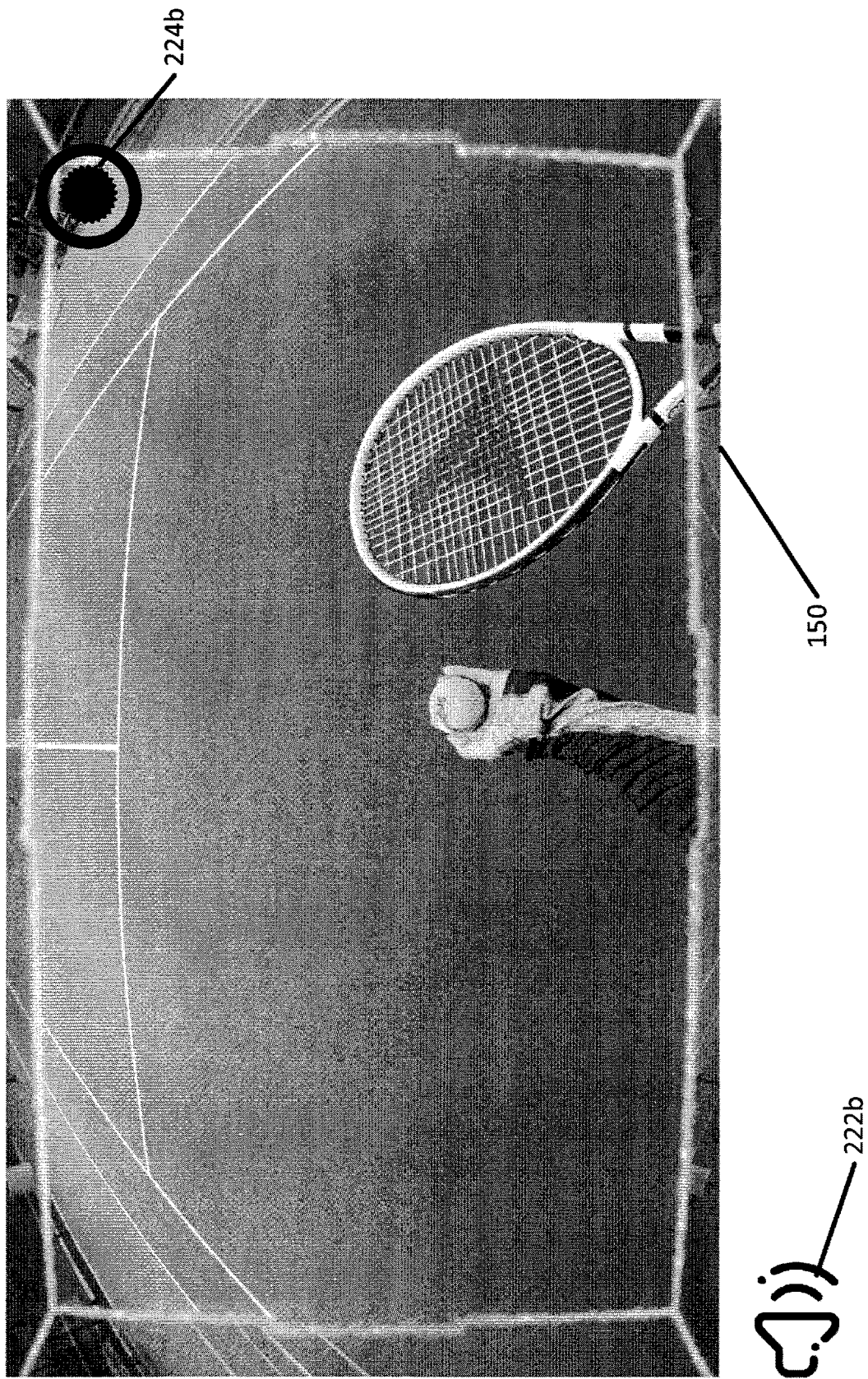

[Fig. 9A]
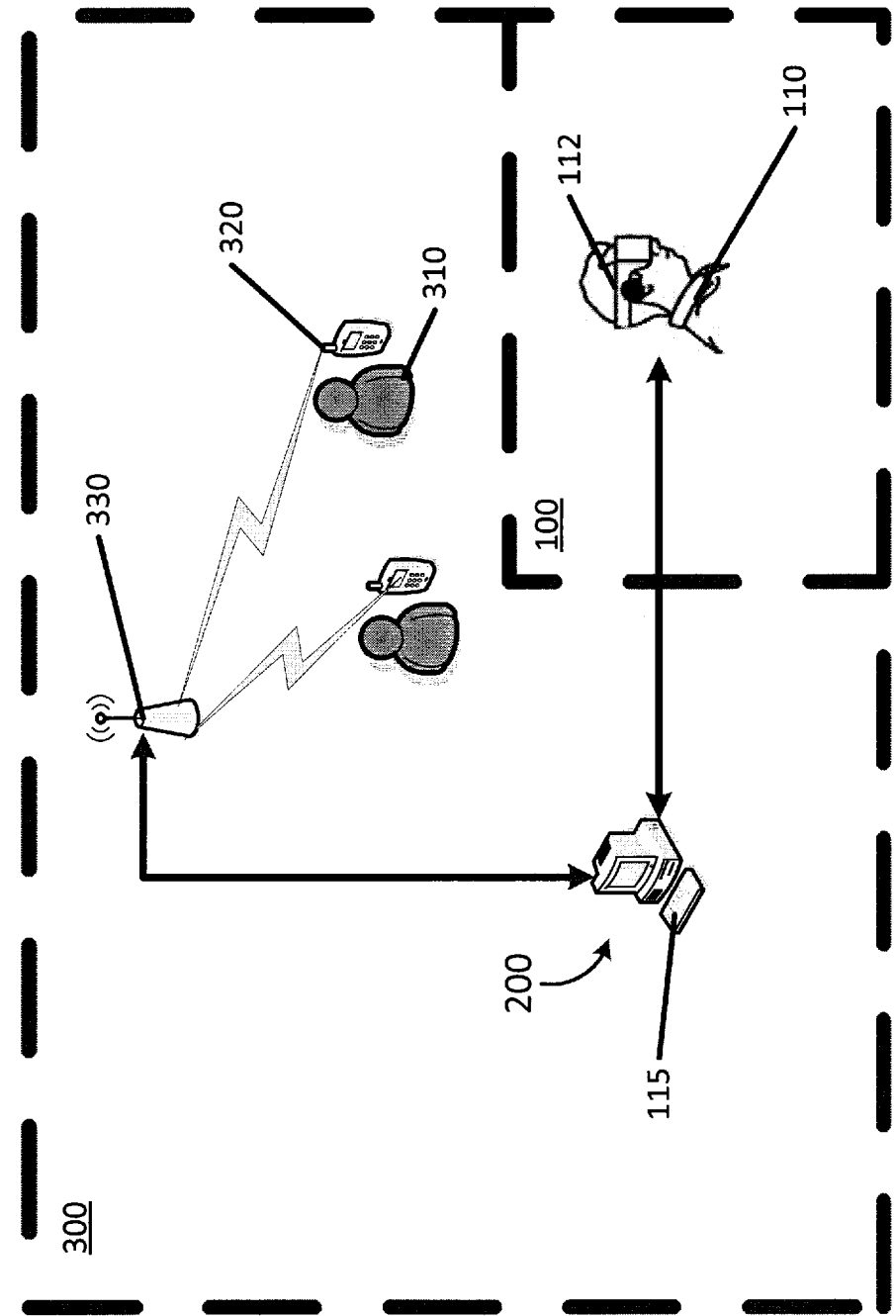

[Fig. 9B]
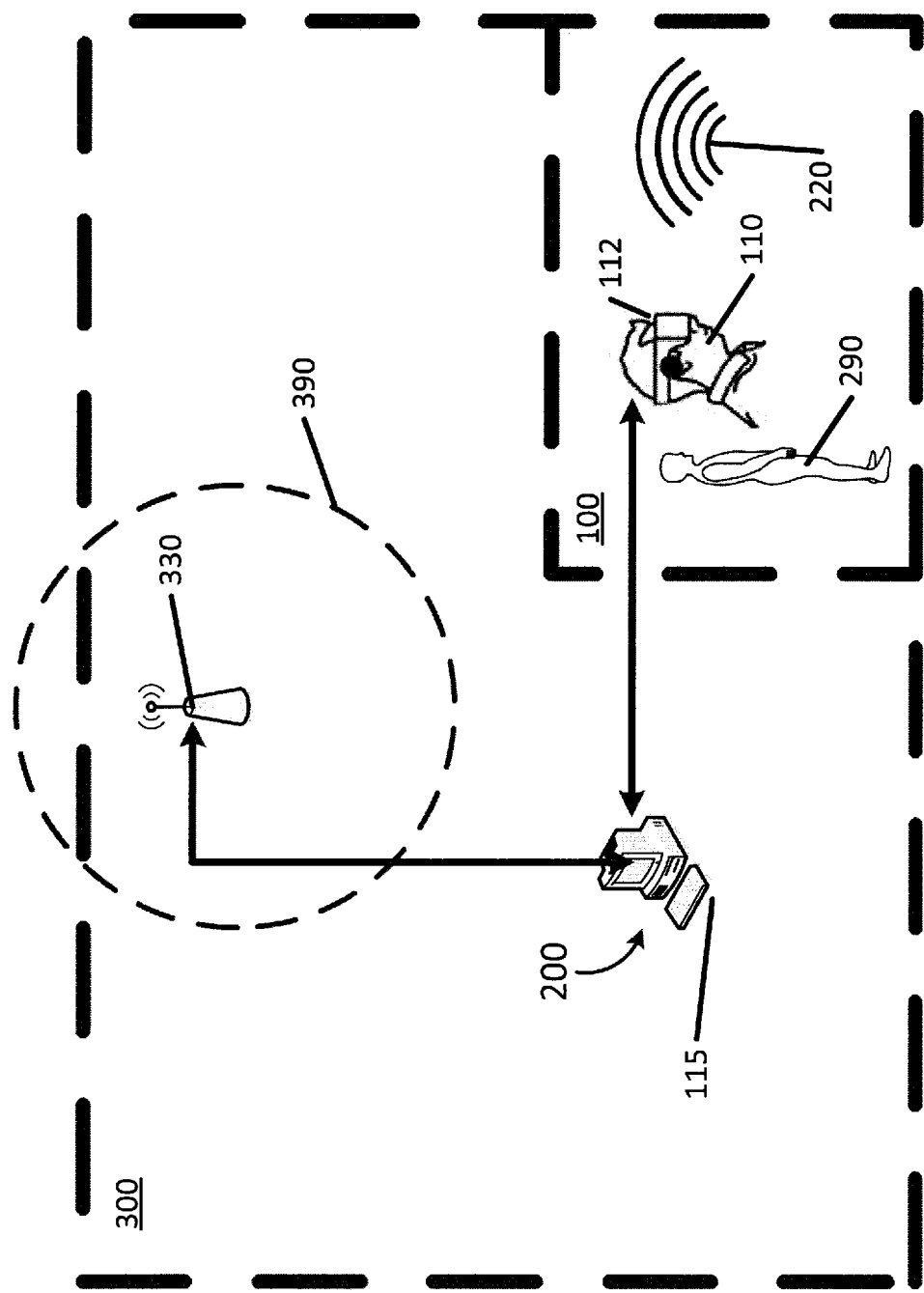

[Fig. 10A]
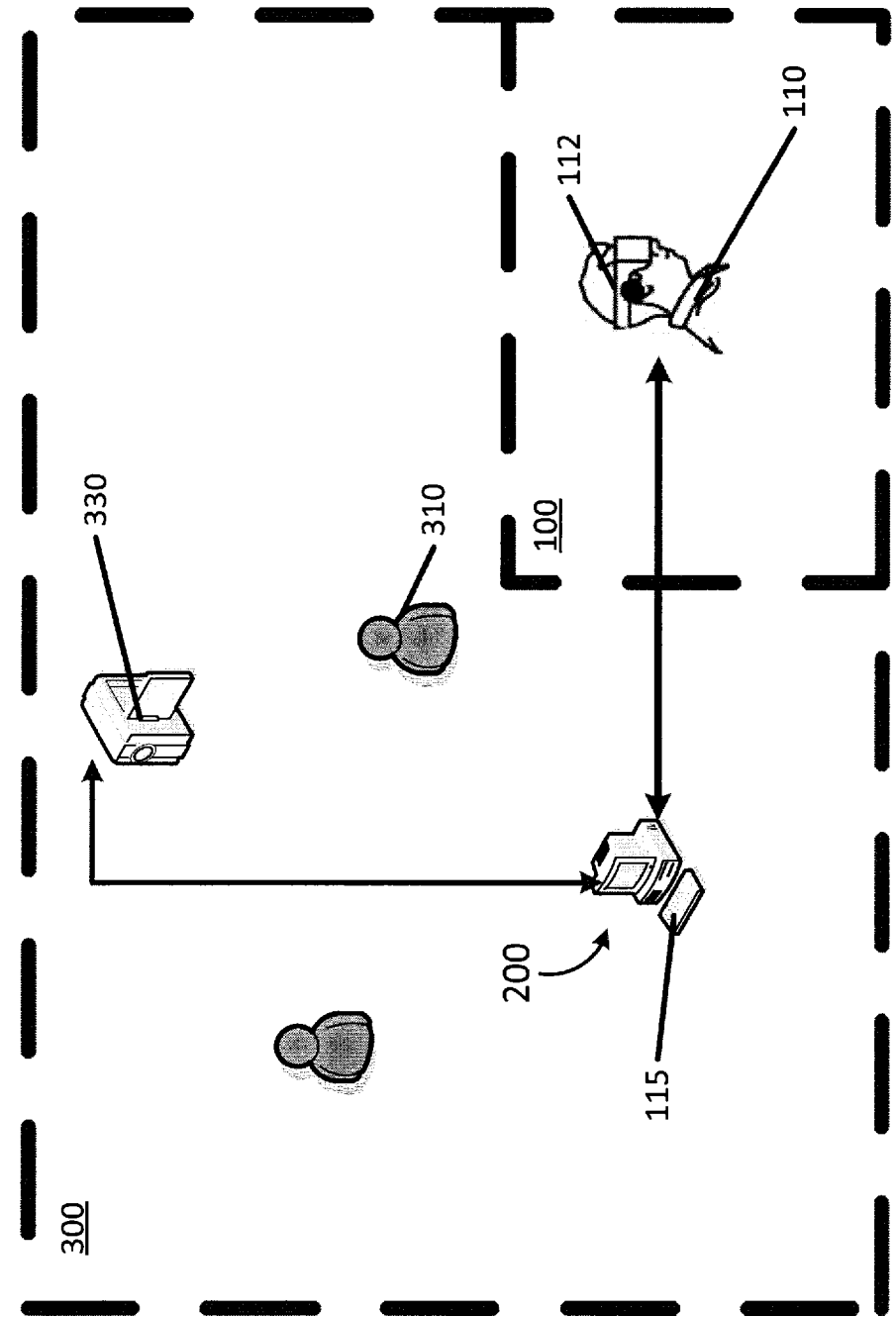

[Fig. 10B]
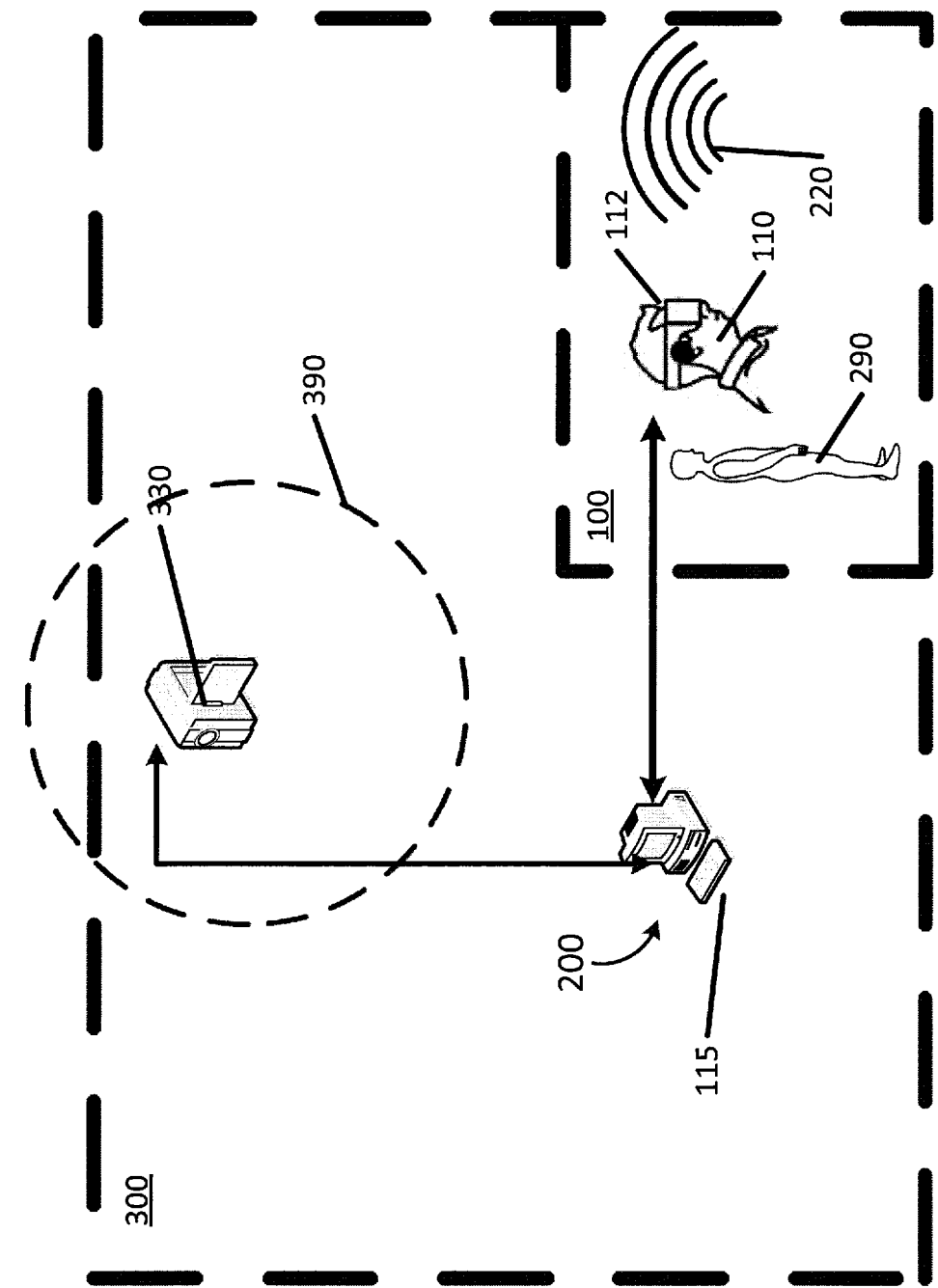

ENVIRONMENT-AWARE MONITORING SYSTEMS, METHODS, AND COMPUTER PROGRAM PRODUCTS FOR IMMERSIVE ENVIRONMENTS

CROSS-REFERENCE TO RELATED APPLICATIONS

The present application is a 35 U.S.C. § 371 national phase application of PCT Application Serial No. PCT/JP2016/084661, filed Nov. 22, 2016, the disclosure of which is hereby incorporated herein in its entirety by reference.

TECHNICAL FIELD

The present inventive concepts relate to display systems, methods, and computer program products and, in particular, display systems, methods, and computer program products for immersive user environments.

BACKGROUND ART

Recent technological advances have created improvements in computer technology such that user environments can be immersive. Examples of immersive user environments include environment commonly known as "virtual reality" and/or "augmented reality." Such immersive environments can provide a richer user experience by completely or substantially replacing video and/or audio input of the user with that of the immersive environment.

For example, in some immersive environments, the view perceived by the user's vision may be completely or substantially replaced by the video output of the immersive environment. This may be accomplished, for example, by a helmet and/or glasses which cover the user's eyes.

Similarly, in some immersive environments, the sounds perceived by the user's hearing may be completely or substantially replaced by the audio output of the immersive environment. This may be accomplished, for example, by speakers associated with a helmet and/or headphones coupled to the user's ears.

SUMMARY

According to aspects of the present inventive concepts, an immersive system may include a processor, a display interface adapted to substantially replace a view of a user of the immersive system with a visual display adapted to be generated by the display interface, an audio interface coupled to an ear of the user of the immersive system, and a memory coupled to the processor and including computer readable program code. When the computer readable program code is executed by the processor, it may cause the processor to perform operations including detecting a first event that occurs in an environment of a user of the immersive system that is external to the display interface while the user is operating the immersive system, initiating monitoring of the environment of the user of the immersive system that is external to the display interface responsive to detecting the first event, detecting a second event that occurs in the environment of the user of the immersive system that is external to the display interface while monitoring the environment of the user of the immersive system that is external to the display interface, and, responsive to determining that the second event matches a defined pattern, providing an indication to the user of the immersive so that the user is alerted.

In some embodiments, detecting the second event may include receiving video input captured from the environment of the user of the immersive system that is external to the display interface, and determining that the second event matches the defined pattern may include determining that the captured video input corresponds to a defined video image.

In some embodiments, detecting the first event may include determining that a number of occupants in the environment of the user of the immersive system that is external to the display interface has changed.

In some embodiments, determining that the number of occupants in the environment of the user of the immersive system that is external to the display interface has changed may include detecting that a number of personal electronic devices in communication with a network gateway associated with the environment of the user of the immersive system that is external to the display interface has changed.

In some embodiments, determining that the number of occupants in the environment of the user of the immersive system that is external to the display interface has changed may include detecting that a number of objects detected by an electronic monitoring device associated with the environment of the user of the immersive system that is external to the display interface has changed.

In some embodiments, the system may further include an immersive headset coupled to the display interface and the audio interface, a video input device coupled to the immersive headset, and an audio input device coupled to the immersive headset. Detecting the second event may include the processor processing input from the video input device and/or the audio input device.

In some embodiments, the system may further include an immersive headset coupled to the display interface and the audio interface, a video input device separate from the immersive headset, an audio input device separate from the immersive headset, and a computer system external to the immersive headset. Detecting the second event may include the processor processing input from the video input device and/or the audio input device, and providing the indication may be performed responsive to a signal provided by the computer system external to the immersive headset.

In some embodiments, the processor and the memory may be coupled to the display interface.

In some embodiments, providing the indication to the user of the immersive system may include providing the indication based on a determined relative importance of the second event.

In some embodiments, the relative importance of the second event may be determined based on a spatial proximity of the second event to the user of the immersive system.

In some embodiments, the first event that occurs in the environment of the user of the immersive system that is external to the display interface may occur at a location that is more remote from the user of the immersive system than the second event that occurs in the environment of the user of the immersive system that is external to the display interface.

In some embodiments, the first event may occur in a first room of a building occupied by the user of the immersive system that is separate from a second room occupied by the user of the immersive system, and the second event may occur within the second room occupied by the user of the immersive system.

In some embodiments, the indication may include a visual indication within the visual display generated by the display interface and/or an audio indication generated by the audio interface.

In some embodiments, providing the indication to the user of the immersive system that includes the visual indication within the visual display generated by the display interface may include providing a video overlay within the visual display that depicts the captured video input.

According to aspects of the present inventive concepts, a computer program product may include a tangible non-transitory computer readable storage medium including computer readable program code embodied in the medium that when executed by at least one processor causes the at least one processor to perform operations. The operations may include detecting a first event that occurs in an environment of a user of an immersive system that is external to a display interface of the immersive system while the user is operating the immersive system, initiating monitoring of the environment of the user of the immersive system that is external to the display interface responsive to detecting the first event, detecting a second event that occurs in the environment of the user of the immersive system that is external to the display interface while monitoring the environment of the user of the immersive system that is external to the display interface, and, responsive to determining that the second event matches a defined pattern, providing an indication to the user of the immersive system so that the user is alerted.

In some embodiments, detecting the second event may include receiving video input captured from the environment of the user of the immersive system that is external to the display interface, and determining that the second event matches the defined pattern may include determining that the captured video input corresponds to a defined video image.

In some embodiments, detecting the first event may include determining that a number of occupants in the environment of the user of the immersive system that is external to the display interface has changed.

In some embodiments, determining that the number of occupants in the environment of the user of the immersive system that is external to the display interface has changed may include detecting that a number of personal electronic devices in communication with a network gateway associated with the environment of the user of the immersive system that is external to the display interface has changed.

In some embodiments, determining that the number of occupants in the environment of the user of the immersive system that is external to the display interface has changed may include detecting that a number of objects detected by an electronic monitoring device associated with the environment of the user of the immersive system that is external to the display interface has changed.

In some embodiments, detecting the second event may include the processor processing input from a video input device and/or an audio input device.

In some embodiments, providing the indication may be performed responsive to a signal provided by a computer system external to the immersive headset.

In some embodiments, providing the indication to the user of the immersive system may include providing the indication based on a determined relative importance of the second event.

In some embodiments, the relative importance of the second event may be determined based on a spatial proximity of the second event to the user of the immersive system.

In some embodiments, the first event that occurs in the environment of the user of the immersive system that is external to the display interface may occur at a location that is more remote from the user of the immersive system than the second event that occurs in the environment of the user of the immersive system that is external to the display interface.

In some embodiments, the first event may occur in a first room of a building occupied by the user of the immersive system that is separate from a second room occupied by the user of the immersive system, and the second event may occur within the second room occupied by the user of the immersive system.

In some embodiments, the indication may include a visual indication within a visual display generated by the display interface of the immersive system and/or an audio indication generated by an audio interface of the immersive system.

In some embodiments, providing the indication to the user of the immersive system that includes the visual indication within the visual display generated by the display interface may include providing a video overlay within the visual display that depicts the captured video input.

According to aspects of the present inventive concepts, a method for alerting a user of an immersive system may include detecting a first event that occurs in an environment of a user of the immersive system that is external to a display interface of the immersive system while the user is operating the immersive system, initiating monitoring of the environment of the user of the immersive system that is external to the display interface responsive to detecting the first event, detecting a second event that occurs in the environment of the user of the immersive system that is external to the display interface while monitoring the environment of the user of the immersive system that is external to the display interface, and, responsive to determining that the second event matches a defined pattern, providing an indication to the user of the immersive system so that the user is alerted.

In some embodiments, detecting the second event may include receiving video input captured from the environment of the user of the immersive system that is external to the display interface, and determining that the second event matches the defined pattern may include determining that the captured video input corresponds to a defined video image.

In some embodiments, detecting the first event may include determining that a number of occupants in the environment of the user of the immersive system that is external to the display interface has changed.

In some embodiments, determining that the number of occupants in the environment of the user of the immersive system that is external to the display interface has changed may include detecting that a number of personal electronic devices in communication with a network gateway associated with the environment of the user of the immersive system that is external to the display interface has changed.

In some embodiments, determining that the number of occupants in the environment of the user of the immersive system that is external to the display interface has changed may include detecting that a number of objects detected by an electronic monitoring device associated with the environment of the user of the immersive system that is external to the display interface has changed.

In some embodiments, detecting the second event may include the processor processing input from a video input device and/or an audio input device.

In some embodiments, providing the indication may be performed responsive to a signal provided by a computer system external to the immersive headset.

In some embodiments, providing the indication to the user of the immersive system may include providing the indication based on a determined relative importance of the second event.

In some embodiments, the relative importance of the second event may be determined based on a spatial proximity of the second event to the user of the immersive system.

In some embodiments, the first event that occurs in the environment of the user of the immersive system that is external to the display interface may occur at a location that is more remote from the user of the immersive system than the second event that occurs in the environment of the user of the immersive system that is external to the display interface.

In some embodiments, the first event may occur in a first room of a building occupied by the user of the immersive system that is separate from a second room occupied by the user of the immersive system, and the second event may occur within the second room occupied by the user of the immersive system.

In some embodiments, the indication may include a visual indication within a visual display generated by the display interface of the immersive system and/or an audio indication generated by an audio interface of the immersive system.

In some embodiments, providing the indication to the user of the immersive system that includes the visual indication within the visual display generated by the display interface may include providing a video overlay within the visual display that depicts the captured video input.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Aspects of the present inventive concepts are illustrated by way of example and are not limited by the accompanying figures with like references indicating like elements.

FIG. 1A illustrates immersive environments according to some embodiments of the present inventive concepts.

FIG. 1B illustrates immersive environments according to some embodiments of the present inventive concepts.

FIG. 2 illustrates a monitoring environment in an immersive environment according to some embodiments of the present inventive concepts.

FIG. 3 is a block diagram of a monitoring system for an immersive environment according to some embodiments of the present inventive concepts.

FIG. 4 illustrates monitoring operations according to some embodiments of the present inventive concepts.

FIG. 5 illustrates operations for initiating monitoring of an immersive environment according to some embodiments of the present inventive concepts.

FIG. 6 illustrates additional operations for initiating monitoring of an immersive environment according to some embodiments of the present inventive concepts.

FIG. 7 illustrates operations for providing an indication in a monitoring method for an immersive environment according to some embodiments of the present inventive concepts.

FIG. 8A illustrates examples of indications in an immersive environment according to some embodiments of the present inventive concepts.

FIG. 8B illustrates examples of indications in an immersive environment according to some embodiments of the present inventive concepts.

FIG. 9A illustrates examples of initiating monitoring for an immersive environment according to some embodiments of the present inventive concepts.

FIG. 9B illustrates examples of initiating monitoring for an immersive environment according to some embodiments of the present inventive concepts.

FIG. 10A illustrates additional examples of initiating monitoring for an immersive environment according to some embodiments of the present inventive concepts.

FIG. 10B illustrates additional examples of initiating monitoring for an immersive environment according to some embodiments of the present inventive concepts.

DESCRIPTION OF EMBODIMENTS

The present inventive concepts are described hereinafter with reference to the accompanying drawings, in which embodiments of the present inventive concepts are shown. The present inventive concepts may, however, be embodied in different forms and should not be construed as limited to the embodiments set forth herein. Rather, these embodiments are provided so that this disclosure is thorough and complete and fully conveys the scope of the present inventive concepts to one skilled in the art.

The terminology used herein is for the purpose of describing particular aspects only and is not intended to be limiting of the present inventive concepts. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on").

It will be understood that although the terms "first," "second," etc. are used herein to describe members, regions, layers, portions, sections, components, and/or elements in example embodiments of the present inventive concepts, the members, regions, layers, portions, sections, components, and/or elements should not be limited by these terms. These terms are only used to distinguish one member, region, portion, section, component, or element from another member, region, portion, section, component, or element. Thus, a first member, region, portion, section, component, or element described below may also be referred to as a second member, region, portion, section, component, or element without departing from the scope of the present inventive concepts. For example, a first element may also be referred to as a second element, and similarly, a second element may also be referred to as a first element, without departing from the scope of the present inventive concepts.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

Various embodiments described herein may arise from a realization that immersive environments can present special challenges for the user of such environments. Immersive environments may mask or partially cover the vision of the user of such environments. Similarly, these environments may mask, distort, or partially obstruct the hearing of a user of such an immersive environment. For example, a user of an immersive environment may have a display covering his or her eyes and may not be able to see an object in front of the user due to the display. As another example, the user of an immersive environment may have headphones and/or other audio devices coupled to his or her ears and may not be able to hear a sound within a room occupied by the user due to the headphones and/or other audio devices. Thus, the user of an immersive environment may have a diminished capability of perceiving audio and/or visual cues that occur within the area near the user.

The immersive nature of the experience can leave the user vulnerable to elements of the environment surrounding the user. For example, noises and other intrusions that might normally be readily perceivable to a user may be masked or distorted while the user is within the immersive environment. This masking or distortion may be especially problematic because the immersive environment may provide additional distractions to the senses of a user of the immersive environment that further decrease the user's ability to detect and/or react to external stimuli. For example, in some immersive environments, the user may be participating in a game that not only interferes with the users hearing and/or vision, but also provides visual displays and/or sounds as part of the game which may mimic realistic visuals and/or sounds. For example, a visual display of people and/or objects, and audio sounds such as loud noises and or talking, which are part of the game experienced by the user of the immersive environment may make it further difficult for the user of the immersive environment to determine which experiences are part of the immersive environment and which are part of the real environment surrounding the user.

Accordingly, the present inventive concepts can provide monitoring systems, methods, and/or computer program products which are capable of alerting a user of an immersive environment of changes to the area that is external to the immersive environment. Further, the present inventive concepts can provide other embodiments which can initiate monitoring responsive to observed events. By initiating monitoring responsive to particular events, the various embodiments described herein may conserve processing capability and/or power of a computing system associating with the monitoring until these resources are more likely to be needed. These various embodiments described herein may therefore provide a reduction in operating overhead, an increase in processing efficiency, and/or an overall reduction in operating costs.

FIGS. 1A and 1B illustrate immersive environments 100 according to some embodiments of the present inventive concepts.

As illustrated in FIG. 1A, an immersive environment 100 for a user 110 may include an immersive headset 112, and a computer 115. As used herein, the term "immersive system" may be used interchangeably to describe immersive environment 100. Systems, methods and/or computer program products, hereinafter referred to as "monitoring system 200," (illustrated, for example, in FIG. 2) may be configured to provide monitoring for the immersive environment 100.

The immersive headset 112 may include a display interface 120 and/or an audio interface 130. The immersive headset 112 may be configured to be worn on the head or other part of the user 110 of the immersive environment 100.

The display interface 120 of the immersive headset 112 may be configured to cover a portion of one or more eyes of the user 110. The display interface 120 of the immersive headset 112 may substantially replace a view of the user 110. As used herein, a display interface 120 which substantially replaces a view of the user 110 may allow some view of the external environment to leak through the immersive headset 112, but the visible field of the user 110 will be effectively replaced by a view generated by the display interface 120. The display interface 120 of the immersive headset 112 may be opaque, transparent, or various combinations of opacity and/or transparency. For example, in some embodiments the display interface 120 may be a fully opaque covering for the eyes of the user 110 which completely covers the eyes of the user 110 and provides a display image 150 which completely replaces the view of the user 110. The display image 150 may be provided as part of the immersive environment 100. In some embodiments the display interface 120 may be transparent glasses which cover the eyes of the user 110 and provide a display image 150 which augments or otherwise enhances the view of the user 110 as seen through the transparent glasses. It will be understood that many display options are available for the display interface 120 of the immersive headset 112 without deviating from the present inventive concepts.

The audio interface 130 of the immersive headset 112 may be configured to couple to one or more ears of the user 110. In some embodiments, the audio interface 130 of the immersive headset 112 may be configured to block all external sound from the environment of the user 110 of the immersive headset 112 and provide an additional audio signal 152 as part of the immersive environment 100. In some embodiments, the audio interface 130 may be configured to let some external audio through to the user 110 and/or may modify the audio being provided to the user 110 to provide audio signal 152. For example, in some embodiments, the audio interface 130 may include a noise-cancelling device. The audio signal 152 may include audio provided as part of the immersive environment 100. Other examples of an audio interface 130 include over-ear headphones, in-ear headphones, earbuds, bone conduction devices, and the like. It will be understood that the many audio options are available for the audio interface 130 of the immersive headset 112 without deviating from the present inventive concepts.

Though FIG. 1A illustrates an immersive headset 112 with a particular configuration of display interface 120 and audio interface 130, it will be understood that other configurations are possible. For example, the immersive headset 112 may include a minimal set of glasses and earbuds in some embodiments. In some embodiments, the immersive headset 112 may be a full helmet which encloses the head of the user 110. In some embodiments, the immersive headset 112 may include a cellular phone or other personal electronic device coupled to the eyes and/or ears of the user 110 of the immersive environment 100.

The immersive headset 112 may be electronically coupled to a computer 115. The computer 115 may provide the computer processing capability of the immersive environment 100 and/or may execute portions of the embodiments described herein. The computer 115 may provide the display image 150 output by the display interface 120 of the immersive headset 112. The computer 115 may also provide the audio signal 152 output by the audio interface 130 of the immersive headset 112.

The computer 115 may be electronically coupled to the immersive headset 112 using wired technology 190*a*, wireless technology 190*b*, or a combination of both wired and wireless technology 190*a*/190*b*. For example, the immersive headset 112 may be connected to the computer 115 via Bluetooth or other wireless protocol.

The computer 115 may be provided in proximity to the user 110 of the immersive headset 112 or may be remote from the user 110. For example, in some embodiments, the computer 115 may be part of a distributed cluster of computing systems, such as a cloud configuration, and the immersive headset 112 may communicate with the computer 115 over a network protocol.

The immersive headset 112 may optionally include a camera (C) 160 and/or microphone (M) 170. The camera 160 may provide an input video signal to the immersive environment 100 corresponding to an image of the area surrounding the user 110 of the immersive headset 112. The camera 160 may provide the input video signal as a moving image and/or a still image. The microphone 170 may provide an input audio signal to the immersive environment 100 corresponding to audio of the area surrounding the user 110 of the immersive headset 112. In some embodiments, the microphone 170 may be part of a noise cancellation system provided by the audio interface 130 of the immersive headset 112.

In some embodiments, the camera 160 and/or the microphone 170 may be provided optionally and/or additionally as part of the computer 115. Similarly, in some embodiments, the camera 160 and/or the microphone 170 may be provided optionally and/or additionally within the immersive environment 100 remote from both the computer 115 and the immersive headset 112. It will be understood that in some embodiments, a plurality of cameras 160 and/or a plurality of microphones 170 may be used within the immersive environment 100 without deviating from the present inventive concepts.

The computer 115 may be able to receive images from the camera 160 and/or audio from the microphone 170 as part of providing the immersive environment 100. The computer 115 may further be able to access additional devices in the immersive environment 100 or external to the immersive environment 100. The access to the additional devices may be provided by wired or wireless protocols, such as computer networking protocols.

For example, in some embodiments (as discussed with respect to FIGS. 9A and 9B) the computer 115 may be able to access gateway devices, such as network gateway devices. In some embodiments (as discussed with respect to FIGS. 10A and 10B), the computer 115 may be able to access electronic monitoring devices, such as motion sensors.

As illustrated in FIG. 1B, the computer 115 of the immersive environment 100 does not necessarily need to be external to the immersive headset 112. In some embodiments, the computer 115 may be provided as part of the immersive headset 112. For example, the computer 115 may include a processor provided as part of the immersive headset 112. In some embodiments, the computer 115 may be provided as part of a separate device worn on the person of the user 110, such as within a backpack, a portable electronic device, and/or a watch, though the present inventive concepts are not limited thereto.

FIG. 2 illustrates a monitoring system 200 in an immersive environment 100 according to some embodiments of the present inventive concepts.

As illustrated in FIG. 2, the monitoring environment 200 may provide an alert 220 responsive to the detection of an event 290. In some embodiments, the event 290 may be detection of an object external to the immersive headset 112 of the user 110. As illustrated in FIG. 2, the object external to the immersive headset 112 of the user 110 initiating the event 290 is a person, but it will be understood that other events 290 may be contemplated, such as a pet, a hazard, such as a fire, a particular time of day, a meteorological event, and/or other event 290 worthy of bringing to the attention of the user 110.

Similarly, though the event 290 illustrated in FIG. 2 is a visual event, the monitoring system 200 may be configured to detect an event 290 which is audio only. For example, the monitoring system may be configured to detect loud noises, sirens, sounds of movement, a telephone, noises associated with weather, etc., though the present inventive concepts are not limited thereto.

The monitoring system 200 may detect the event 290 by monitoring the environment external to the immersive headset 112 via the camera 160, the microphone 170, and/or other input devices. For example, the computer 115 may process a video signal provided by the camera 160 and/or an audio signal provided by the microphone 170 to detect the event 290.

In some embodiments, the computer 115 may process the video signal provided by the camera 160 to determine if a portion of the video signal corresponds to a defined video image. For example, the computer 115 may provide image detection techniques to the video signal provided by the camera 160 to determine if a portion of the video signal resembles a known image, such as, for example, a person or a dog. It will be understood that such techniques do not require an exact match between the video signal and a predefined image, but rather that such techniques may detect that an overall shape matches a known video configuration which corresponds to a known image.

For example, by detecting that a portion of the video signal contains a shape having a torso-like construction with additional shapes which resemble arms and/or legs, the computer 115 may determine that the received video image contains a human. Similarly, by detecting that a portion of the video signal contains a smaller shape having a smaller torso-like construction with additional shapes which resemble legs, the computer 115 may determine that the received video image contains a dog. The computer 115 may use machine learning, neural network, and/or other techniques to perform image detection on the video signal from the camera 160.

In some embodiments, the computer 115 may process the audio signal provided by the microphone 170 to determine if a portion of the audio signal corresponds to a defined audio pattern. For example, the computer 115 may provide audio processing techniques to the audio signal provided by the microphone 170 to determine of a portion of the audio signal resembles a known audio pattern, such as a particular sound. It will be understood that such techniques do not require an exact match between the audio signal and a predefined sounds, but rather that such techniques may detect that an overall sound frequency and/or pattern matches a known audio pattern which corresponds to a known sound.

For example, by detecting that a portion of the audio signal contains an audio pattern which corresponds to a human voice, the computer 115 may determine that someone is speaking to the user 110 of the immersive environment 100. Similarly, by processing a particular frequency of the audio signal, the computer 115 may determine that a siren is sounding external to the immersive headset 112. The computer 115 may use machine learning, neural network, and/or other techniques to perform audio processing on the audio signal from the microphone 170.

The alert 220 provided to the user 110 of the immersive headset 112 may be an audio alert 222 and/or a video alert 224. For example, the audio alert 222 may be an audio tone or other audio signal provided via the audio interface 130 of the immersive headset 112. In some embodiments, the audio alert 222 may be provided in conjunction with audio signal 152 (see FIG. 1A) provided as part of the immersive environment 100.

In some embodiments, the alert 220 may also be, or include, haptic feedback. The haptic feedback may be provided via a haptic interface of the immersive headset 112. In some embodiments, the haptic interface may include a vibration actuator or other similar device configured to provide vibration feedback to the user 110 of the immersive headset 112.

In some embodiments, the video alert 224 may be a video element provided via the display interface 120 of the immersive headset 112. For example, the video alert 224 may include a shape and/or other form provided as part of the video display 150 provided via the display interface 120 of the immersive headset 112. In some embodiments, the video alert 224 may include a video overlay provided via the display interface 120 of the immersive headset 112 that partially or completely overlays a display image 150 of the immersive environment 100. For example, in response to detecting movement within, or an object coming into, a room of a user 110 of the immersive environment 100, an alert 220 provided to the user 110 may be video alert 224 that includes overlaying a display image 150 of a game currently being displayed by the display interface 120 of the immersive headset 112 with an image that was captured by a camera 160 of the immersive environment 100. In some embodiments, the video alert 224 may temporarily replace the display image 150 provided by the display interface 120 of the immersive headset 112.

Though a camera 160 and a microphone 170 are discussed as mechanisms for detecting events 290, it will be understood that other monitoring methods are possible without deviating from the present inventive concepts. For example, the monitoring system 200 may utilize ultrasonic sensors, motion sensors, thermal sensors, light sensors, Light Imaging, Detection, and Ranging (LIDAR) systems, weight sensors, meteorological sensors, and/or other monitoring systems similar to those described herein.

In some embodiments, the monitoring system 200 may provide differentiations of the alerts 220. The differentiations may depend on a relative importance of the alert 220 as determined by the computer 115.

For example, the computer 115 may categorize an alert 220 as an alert of higher importance based on portion of the video signal received from the camera 160. For example, the computer 115 may determine that an alert 220 is of higher importance based on a detection made via the camera 160 that an object is relatively close to the user 110. That is to say that an object detected closer to the user 110 of the immersive environment 100 may be categorized of higher importance than an object detected further from the user 110 of the immersive environment 100.

In some embodiments, the computer 115 may categorize that an alert 220 is of higher importance based on a determined match between a video signal received from the camera 160 and known objects. For example, the computer 115 may determine that the detection of a person in proximity to the user 110 of the immersive environment 100 is of higher importance than the detection of an animal in proximity to the user 110. In some embodiments, the relative importance may be based on a detected size of the object as determined from the video signal of the camera 160. For example, a larger detected object may be of a higher relative importance than a smaller detected object.

In some embodiments, the computer 115 may categorize an alert 220 as an alert of higher importance based on portion of the audio signal received from the microphone 170. For example, the computer 115 may determine that an alert 220 is of higher importance based on detection of a sound via the microphone 170 that has a relatively high volume. In some embodiments, a higher relative importance may be given to sounds that are characterized as speech. In some embodiments, a higher relatively importance may be given to sounds that contain particular keywords, such as, for example, a name of the user 110.

In some embodiments, the computer 115 may categorize an alert 220 as an alert of higher importance based on combination of the audio signal received from the microphone 170 and the video signal received from the camera 160. For example, an image of an animal received from the camera 160 may not be categorized as higher importance unless simultaneously coupled with an audio signal from the microphone 170 that indicates the sound of barking.

It will be understood that alerts 220 may change over time. An alert that is of low importance may become high importance over time, and vice versa. In some embodiments, the computer 115 may determine a relative importance based on duration of a sound. For example, a detected sound may not immediately raise an alert 220, but may result in a higher importance alert if the sound continues. As another example, a detected motion may not immediately raise an alert 220, but may result in a higher importance alert if the motion continues.

In some embodiments, the relative importance of the alert 220 may be determined based on stored feedback. For example, when determining the importance of an alert 220, the computer 115 may access a data repository to determine if the user 110 of the immersive environment 100 has provided information related to a particular detected event 290. For example, the user 110 of the immersive environment 100 may have provided feedback indicating that a sound of a crying baby is to have a higher relative importance than a sound of a barking dog.

The feedback provided in the data repository may be pre-programmed within the immersive environment 100. In some embodiments, the feedback may be provided dynamically. In some embodiments, the immersive headset 112 may contain an input 230. Upon receipt of an alert 220 in response to an event 290, the user 110 may access the input 230 to provide the feedback to the computer 115. For example, the user 110 may provide feedback via the input 230 that a particular alert 220 is to be of higher importance in the future. Similarly, the user 110 may provide via the input 230 that the particular alert 220 is to be of lower importance in the future.

The feedback provided by the user 110 may be particularly configured for the user 110. That is to say that the feedback may be stored per user 110 so that the computer 115 implements feedback particular to the user 110. Similarly, in some embodiments, the user 110 may be able to configure which alerts 220 the user 110 is to receive. That is to say that the user 110 may set a particular threshold of importance such that alerts 220 having a relative importance below the threshold are not displayed to the user 110.

Referring now to FIGS. 8A and 8B, the alert 220 may be differentiated into one or more alert levels. In some embodiments, the alert level of the alert 220 may be based on the relative importance, such as a high importance and/or low importance alert. For example, the display interface 120 of the immersive headset 112 may display a low importance alert visual element 224a when the alert 220 is of a relatively low importance and may display a high importance alert visual element 224b when the alert 220 is of a relatively high importance. Similarly, the audio interface 130 of the immersive headset 112 may display a low importance alert audio signal 222a when the alert 220 is of a relatively low importance and may display a high importance audio signal 222b when the alert 220 is of a relatively high importance. It will be understood that the audio alert 222 and the visual alert 224 may be provided by the immersive environment 100 together, separately, or in various combinations thereof. It will also be understood that though only a high importance and low importance alert 220 are discussed, multiple differentiations of importance are possible, such as two, three, four, or more, levels of importance without deviating from the present inventive concepts.

Though illustrated separately, it will be understood that the relative importance of the alert 220 may be communicated by presenting a given visual alert 224 and/or audio alert 222 with different characteristics. For example, the relative importance of the visual alert 224 may be indicated by utilizing flashing of a same image. In some embodiment, the low importance visual alert 224a may be indicated by a first visual element and the high importance visual alert 224b may be indicated by flashing, or performing some other visual modification to, the first visual element within the display image 150. Similarly, the relative importance of the audio alert 222 may be indicated by utilizing volume for a particular sound. In some embodiment, the low importance audio alert 222a may be indicated by providing an audio alert 222 at a first volume, and the high importance audio alert 224b may be indicated by providing an audio alert 222 at a second volume, louder than the first volume.

In some embodiments, the type of alert 220 provided may depend on the type of event 290 detected. For example, in some embodiments, a visual alert 224 may be displayed when an event 290 is detected by the camera 160, and an audio alert 222 may be played when an event 290 is detected by the microphone 170.

In some embodiments, the type of alert 220 provided may depend on the relative importance of the alert 220. For example, in some embodiments, a visual alert 224 may be displayed when the alert 220 is of relatively high importance, and an audio alert 222 may be played when the alert 220 is of relatively low importance.

In some embodiments, the type of alert 220 provided may depend on a detected location of the event 290. For example, in some embodiments, a visual alert 224 may be displayed when the event 290 is detected to be in close proximity to the user 110, and an audio alert 222 may be played when the event 290 is detected to be more remote from the user 110.

It will be understood that the relative importance of an event 220 and variations in the types of alerts 220 may be combined. For example, as discussed herein, the monitoring system 200 may display a visual alert 224 when an object is nearer the user 110 and may further differentiate between a low importance visual alert 224a and a high importance visual alert 224b based on the type of event detected. Those of skill in the art will recognize that other combinations of type and relative importance of alerts 220 are possible without deviating from the spirit of the present inventive concepts.

As noted herein, the monitoring system 200 may detect events 290 using a computer 115. In some embodiments, the monitoring system 200 may initiate the monitoring for events 290 as soon as the immersive environment 100 is powered on. For example, the monitoring system 200 may begin monitoring for events 290 when the immersive headset 112 is powered on and/or when the computer 115 is powered on.

In some embodiments, the monitoring system 200 may delay initiation of the monitoring of events 290 until after the immersive environment 100 has been powered on. FIGS. 9A and 9B illustrate examples of initiating monitoring for the immersive environment 100 according to some embodiments of the present inventive concepts. FIGS. 10A and 10B illustrate additional examples of initiating monitoring for the immersive environment 100 according to some embodiments of the present inventive concepts.

In the embodiments such as those illustrated in FIGS. 9A, 9B, 10A, and 10B, the monitoring system 200 may delay initiation of the monitoring of events, such as event 290 described with respect to FIG. 2, until the monitoring system 200 has detected an initiation event 390. The initiation event 390 may be of a different type, and may be detected via a different mechanism, than the event 290.

For example, in some embodiments the initiation event 390 may correspond to a detection of a change in the number of occupants 310 near an area occupied by the user 110 of the immersive system 100. The area monitored for the initiation event 390 may be an external area 300 that is external to the immersive system 100. In some embodiments, the change in the number of occupants 310 may refer to an increase or reduction in the number of occupants 310 in a house containing a room in which the user 110 is operating the immersive system 100. Stated another way, the monitoring system 200 may detect that occupants 310 have entered or left a building occupied by the user of the immersive environment 100. Responsive to detecting that occupants 310 have entered or left the building, the monitoring system 200 may initiate monitoring of the area more proximate to the user 110. The monitoring system 200 may determine that the number of occupants 310 has changed, and thus an initiation event 390 has been detected, in various ways.

For example, as illustrated in FIGS. 9A and 9B, the initiation event 390 may correspond to the detection of a change in the number of occupants 310 in an external environment 300 that is external to the immersive environment 100. This detection may be accomplished by querying a number of personal electronic devices 320 in communication with a network gateway 330 that covers the external environment 300. The computer 115 of the immersive environment 100 may communicate with the gateway 330 periodically to receive a message indicating the number of personal electronic devices 320 that are currently in communication with the gateway 330. The computer 115 may utilize the number of personal electronic devices 320 in communication with the gateway 330 as an estimate for the number of occupants 310 in proximity to the immersive environment 100.

The computer 115 may determine that an initiation event 390 has occurred when a change in the number of personal electronic devices 320 in communication with the gateway 330 is greater than a defined threshold. In some embodiments, the change may be an increase or a decrease in the number of personal electronic devices 320. That is to say that the monitoring system 200 may initiate the detection of events 290 responsive to additional occupants 310 detected external to the immersive environment 100, responsive to fewer occupants 310 detected external to the immersive environment 100, or combinations of both.

The gateway 330 may be a wireless network gateway, an ad hoc network gateway, a mobile hotspot, or similar technology. In some embodiments, the gateway 330 may inform the computer 115 of the number of personal electronic devices 320 that have established a network connection with the gateway 330. In some embodiments, the gateway 330 may inform the computer 115 of the number of personal electronic devices 320 that have attempted to establish a network connection with the gateway 330, whether successful or not. That is to say that the monitoring system 200 may initiate monitoring of events 290 responsive to detection of the presence of personal electronic devices 320 that attempt, but are not successful, to communicate with the gateway 330.

Referring to FIGS. 10A and 10B, in some embodiments the monitoring system 200 may initiate monitoring responsive to an initiation event 390 corresponding to the detection of a change in the number of occupants 310 as reported by an electronic monitoring device 360. Electronic monitoring device 360 may, for example, be a remote camera, heat sensor, weight sensor, etc. monitoring the external environment 300 that is external to the immersive environment 100. In some embodiments, the electronic monitoring device 360 may be associated with a security system. In some embodiments, the electronic monitoring device 360 may be associated with a climate control system which automatically monitors a home. Though illustrated as occupants 310 within FIGS. 10A and 10B, it will be understood that the electronic monitoring device 360 may be able to detect other objects in addition to or instead of people, such as occupants 310. With respect to the electronic monitoring device 360, the terms "object" and "occupant" will be used interchangeably with respect to what the electronic monitoring device 360 is capable of detecting.

The computer 115 may monitor the external environment 300 by querying a number of objects 310 detected by the electronic monitoring device 360. The computer 115 of the immersive environment 100 may communicate with the electronic monitoring device 360 periodically to receive a message indicating the number of detected objects. In some embodiments, the electronic monitoring device 360 may be able to detect a discrete number of objects and/or occupants 310 within the external environment 300. In some embodiments, the electronic monitoring device 360 may only provide a binary indication as to whether an occupant 310 has been detected or not. The computer 115 may communicate with the electronic monitoring device 360 via a wired or wireless protocol. In some embodiments, the computer 115 may communicate with the electronic monitoring device 360 via other network gateways, including gateways similar to the network gateway 330 discussed with respect to FIGS. 9A and 9B.

The computer 115 may determine that an initiation event 390 has occurred when a change in the number of occupants 310 detected by the electronic monitoring device 360 is greater than a defined threshold. In some embodiments, the change may be an increase or a decrease in the number of occupants 310. That is to say that the monitoring system 200 may initiate the detection of events 290 responsive to additional occupants 310 detected in the external environment 300 external to the immersive environment 100, responsive to fewer occupants 310 detected external to the immersive environment 100, or combinations of both.

Though illustrated in FIGS. 9A, 9B, 10A, and 10B as separate from the user 110, the computer 115 may also be located spatially proximate to the user 110.

Though initiation utilizing a network gateway 330 and an electronic monitoring device 360 have been discussed separately, it will be understood that these methods can be combined in some embodiments to provide a detection method for an initiation event 390. Similarly, it will be understood that other types of monitoring equipment may be utilized to detect the initiation event 390 without deviating from the present inventive concepts.

In addition, it will be understood that the monitoring methods used to detect the initiation event 390 may also be used by the monitoring system 200 to detect the event 290 so as to generate an alert 220 within the immersive environment 100. That is to say that the monitoring system 200 may utilize a change in a number of occupants 310 detected by a network gateway 330 as an initiation event 390 to begin monitoring. The monitoring system 200 may further utilize a subsequent additional change in the number of occupants 310 detected by the network gateway 300 as an event 290 to provide an alert 220 within the immersive environment 100. Similarly, a change in a number of occupants 310 detected by an electronic monitoring device 360 may be used by the monitoring system 200 as an initiation event 390 to begin monitoring. The monitoring system 200 may further utilize a subsequent additional change in the number of occupants 310 detected by the electronic monitoring device 360 as an event 290 to provide an alert 220 within the immersive environment 100. In some embodiments the camera 160 and microphone 170 may also provide the initiation event 390 to the monitoring system 200 in addition to detecting the event 290 as described herein.

In addition to, or instead of, detecting a change in the number of occupants 310 in the external environment 300 as the initiation event 390 to begin monitoring, the monitoring system 200 may detect other events that may serve as the initiation event 390. For example, the monitoring system 200 may detect remote sounds in the external environment 300, such as a telephone call or other noise. For example, the electronic monitoring device 360 may be a remote microphone that may be accessed by the computer 115 of the monitoring system 200 to determine that an initiation event 390 has occurred.

In some embodiments, the monitoring system 200 may detect a first event, the initiation event 390, that occurs in the external environment 300 that is more remote from the user 110 of the immersive environment 100 than the second event 290 that occurs external to the immersive headset 112. In other words, the initiation event 390 may occur further from the user 110 of the immersive environment 100 than the event 290 which generates the alert 220. For example, in some embodiments, the initiation event 390 may occur within a house occupied by the user 110, while the event 290 that generates the alert 220 occurs within a room occupied by the user 110.

FIG. 3 is a block diagram of a monitoring system 200 for an immersive environment 100 according to some embodiments of the present inventive concepts. The monitoring system 200 may use hardware, software implemented with hardware, firmware, tangible computer-readable storage media having instructions stored thereon and/or a combination thereof, and may be implemented in one or more computer systems or other processing systems. The monitoring system 200 may also utilize a virtual instance of a computer 115. As such, the devices and methods described herein may be embodied in any combination of hardware and software.

As shown in FIG. 3, the monitoring system 200 may include one or more processors 610 and memory 620 coupled to an interconnect 630. The interconnect 630 may be an abstraction that represents any one or more separate physical buses, point to point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 610 may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks. The processor 610 may be configured to execute computer program instructions from the memory 620 to perform some or all of the operations and methods for one or more of the embodiments disclosed herein.

The monitoring system 200 may also include one or more communication adapters 640 that may communicate with other communication devices and/or one or more networks, including any conventional, public and/or private, real and/or virtual, wired and/or wireless network, including the Internet. The communication adapters 640 may include a communication interface and may be used to transfer information in the form of signals between the monitoring system 200 and another computer system or a network (e.g., the Internet). The communication adapters 640 may include a modem, a network interface (such as an Ethernet card), a wireless interface, a radio interface, a communications port, a PCMCIA slot and card, or the like. These components may be conventional components, such as those used in many conventional computing devices, and their functionality, with respect to conventional operations, is generally known to those skilled in the art.

The monitoring system 200 may further include memory 620 which may contain program code 670 configured to execute operations associated with the methods described herein. The memory 620 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The memory 620 may also include systems and/or devices used for storage of the monitoring system 200.

The monitoring system 200 may also include a notification circuit 660. The notification circuit 660 may implement technology configured to monitor the environment associated with an immersive environment 100 using methods as described herein. The notification circuit 660 may be further configured to monitor for initiation events 390 and/or generate alerts 220 responsive to events 290. The notification circuit 660 may communicate with the processor 610 and/or other elements of the monitoring system 200 via the system interface 630. In some embodiments, the notification circuit 600 may be configured to transmit a message to a server external to the monitoring system 200 utilizing the communication adapters 640.

The monitoring system 200 may also include input devices such as, but not limited to, a camera 160 and/or a microphone 170. The input devices may be accessible to the one or more processors 610 via the system interface 630 and may be operated by the program code 670 resident in the memory 620.

The monitoring system 200 may also include a display 690 capable of generating a display image 150 and/or visual alert 224 (see FIG. 2). The monitoring system 200 may also include a speaker 295 capable of generating an audio signal 152 and/or audio alert 222 (see FIG. 2).

The monitoring system 200 may also include a storage repository 650. The storage repository may be accessible to the processor 610 via the system interface 630 and may additionally store information associated with the monitoring system 200. For example, in some embodiments, the storage repository 650 may contain user preferences and/or configurations for alerts described herein.

The monitoring system 200 may also include a feedback circuit 665. The feedback circuit 665 may provide an electronic means for a user 110 (see FIG. 1) of the monitoring system 200 to provide feedback relevant to a particular alert 220, as described herein. The feedback provided by the feedback circuit 665 may be processed by the processor 610 and stored within the storage repository 650 or transmitted external to the monitoring system 200 via the communication adapter 640.

FIG. 4 illustrates monitoring operations according to some embodiments of the present inventive concepts.

Referring to FIG. 4, the operations may begin with operation 1410 by detecting a first event 390 that occurs in an environment of a user 110 of an immersive system 100 that is external to a display interface 120 while the user 110 is operating the immersive system 100. For example, as illustrated in FIGS. 9A, 9B, 10A, and 10B and described herein, operation 1410 may detect a change in the number of occupants in areas that are external to the immersive system 100 to determine that the first event, or initiation event, 390 has occurred. The environment of the user 110 of the immersive system 100 that is external to the display interface 120 may include environments that are external to the immersive environments 100 described herein. For example, the environment external to the display interface 120 may be the external environment 300 illustrated with respect to FIGS. 9A, 9B, 10A, and 10B. That is to say that, in some embodiments, the environment external to the display interface 120 may be the environment that surrounds the immersive environment 100.

The operations may continue with operation 1420 by initiating monitoring of the environment the user 110 of the immersive system 100 that is external to the display interface 120 responsive to detecting the first event 390. For example, as described with respect to FIG. 2, operation 1420 may begin monitoring for events 290 responsive to detecting the initiation event 390.

The operations may continue with operation 1430 by detecting a second event 290 that occurs in the environment of the user 110 of the immersive system 100 that is external to the display interface 120 while monitoring the environment of the user 110 of the immersive system 100 that is external to the display interface 120.

Operation 1440 may determine that the second event 290 matches a defined pattern. If the second event 290 does not match the defined pattern, the operations may return to operation 1430 to continue monitoring for the second event 290. If the second event 290 matches the defined pattern, the operations may proceed to operation 1460. For example, as described with respect to FIG. 2, operation 1440 may process a video signal provided via a camera 160 and/or an audio signal provided via a microphone 170 to determine if the second event 290 matches a defined pattern.

Operation 1460 may provide an indication, such as alert 220, to the user 110 of the immersive headset 112 that comprises a visual indication 224 within a visual display 150 generated by the display interface 120 and/or an audio indication 220 generated by the audio interface 130. For example, as described with respect to FIG. 2, a visual alert 224 may be provided within the immersive environment 100 as part of the display interface 120 and/or an audio alert 220 may be provided as part of the audio interface 130.

FIG. 5 illustrates operations for initiating monitoring of an immersive environment 100 according to some embodiments of the present inventive concepts. The operations of FIG. 5 are also described herein with respect to FIGS. 9A and 9B.

Referring to FIG. 5, the operations may begin as part of operation 1410 for detecting a first event 390 that occurs in an environment of a user 110 of the immersive system 100, described with respect to FIG. 4. The operations may include operation 1510 including determining that a number of occupants in the environment of the user 110 of the immersive system 100 that is external to the display interface 120 has changed by detecting that a number of personal electronic devices 320 in communication with a network gateway 330 associated with the environment of the user 110 of the immersive system 100 that is external to the display interface 120 has changed. An example of operation 1410 is illustrated in FIGS. 9A and 9B in which a network gateway 330 monitors personal electronic devices 320 of occupants 310 in an external environment 300 that is remote from the immersive environment 100.

The operations may continue with operation 1520 which determines whether the number of personal electronic devices 320 has changed. If the number of personal electronic devices 320 has not changed, operation 1510 may be repeated to continue monitoring the presence of personal electronic devices 320.

If the number of personal electronic devices 320 has changed, the operations may continue to operation 1530 in which it is determined whether the change in the number of personal electronic devices 320 is above a defined threshold. If the change in the number of personal electronic devices 320 is not above the defined threshold, operation 1510 may be repeated to continue monitoring the presence of personal electronic devices 320. If the change in the number of personal electronic devices 320 is above the defined threshold, the operations may continue on to begin initiate monitoring, such as with operation 1420 described with respect to FIG. 4.

FIG. 6 illustrates additional operations for initiating monitoring of an immersive environment 100 according to some embodiments of the present inventive concepts. The operations of FIG. 6 are also described herein with respect to FIGS. 10A and 10B.

Referring to FIG. 6, the operations may begin as part of operation 1410 for detecting a first event 390 that occurs in an environment of a user 110 of the immersive system 100, described with respect to FIG. 4. The operations may include operation 1610 including determining that a number of occupants 310 in the environment of the user 110 of the immersive system 100 that is external to the display interface 120 has changed by detecting that a number of objects 310 detected by an electronic monitoring device 360 associated with the environment of the user 110 of the immersive system 100 that is external to the display interface 120. An example of operation 1610 is illustrated in FIGS. 10A and 10B in which an electronic monitoring device 360 detects occupants 310 in an external environment 300 that is remote from the immersive environment 100.

The operations may continue with operation 1620 in which it is determined whether the number of objects 310 has changed. If the number of objects 310 has not changed, operation 1610 may be repeated to continue monitoring the presence of objects 310.

If the number of objects 310 has changed, the operations may continue to operation 1630 in which it is determined whether the change in the number of objects 310 is above a defined threshold. If the change in the number of objects 310 is not above the defined threshold, operation 1610 may be repeated to continue monitoring the presence of objects 310. If the change in the number of objects 310 is above the defined threshold, the operations may continue on to begin initiate monitoring, such as with operation 1420 described with respect to FIG. 4.

FIG. 7 illustrates operations for providing an indication 220 in a monitoring method for an immersive environment 100 according to some embodiments of the present inventive concepts. The operations of FIG. 7 are also described herein with respect to FIG. 2.

Referring to FIG. 7, the operations may begin as part of operation 1460 for providing an indication 220 responsive to operation 1430 for detecting a second event 290, described with respect to FIG. 4. The operations may include operation 1710 in which it is determined if the second event 290 is categorized as high importance. This operation may include referring to specific characteristics of the second event 290 and/or other preferences/feedback provided by the user 110 of the immersive system 100. If the second event 290 is categorized to be high importance, the operations may continue with operation 1730 in which a high importance event (e.g. high importance visual event 224b or high importance audio event 222*b*) is raised. After raising the event, the operations may continue with additional monitoring, such as with operation 1430.

If the second event 290 is not categorized high importance, the operations may continue with operation 1730 in which it is determined if the second event 290 is within a threshold proximity to the user 110. If the second event 290 is within a threshold proximity to the user 110, the operations may continue with operation 1730 in which a high importance event is raised. If the second event 290 is not within a threshold proximity to the user 110, the operations may continue with operation 1740 in which a low importance event (e.g. low importance visual event 224*a* or low importance audio event 222*a*) is raised.

In some embodiments, the monitoring system 200 may continue with monitoring for a second event 290 (e.g. operation 1430 discussed with respect to FIG. 4) after raising the alert 220.

As will be appreciated by one skilled in the art, aspects of the present inventive concepts may be illustrated and described herein in any of a number of patentable classes or context including any new and useful process, machine, manufacture, or composition of matter, or any new and useful improvement thereof. Accordingly, aspects of the present inventive concepts may be implemented entirely hardware, entirely software (including firmware, resident software, micro-code, etc.) or combining software and hardware implementation that may all generally be referred to herein as a "circuit," "module," "component," or "system." Furthermore, aspects of the present inventive concepts may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present inventive concepts may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present inventive concepts are described herein with reference to flowchart illustrations and/or block diagrams of methods, apparatus (systems) and computer program products according to embodiments of the present inventive concepts. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present inventive concepts. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present inventive concepts has been presented for purposes of illustration and description, but is not intended to be exhaustive or limited to the present inventive concepts in the form disclosed. Many modifications and variations will be apparent to those of ordinary skill in the art without departing from the scope and spirit of the present inventive concepts. The aspects of the present inventive concepts herein were chosen and described in order to best explain the principles of the present inventive concepts and the practical application, and to enable others of ordinary skill in the art to understand the present inventive concepts with various modifications as are suited to the particular use contemplated.

The invention claimed is:

1. An immersive system, comprising:
a display interface adapted to substantially replace a view of a user of the immersive system with a visual display adapted to be generated by the display interface;
an audio interface coupled to an ear of the user of the immersive system; and
a processor configured to perform operations comprising:
detecting a first event that occurs in an environment of a user of the immersive system that is external to the display interface while the user is operating the immersive system;
initiating monitoring of the environment of the user of the immersive system that is external to the display interface responsive to detecting the first event;
detecting a second event that occurs in the environment of the user of the immersive system that is external to the display interface while monitoring the environment of the user of the immersive system that is external to the display interface; and
responsive to determining that the second event matches a defined pattern, providing a visual indication within the visual display generated by the display interface to the user of the immersive system so that the user is alerted,
wherein detecting the first event comprises determining that a number of occupants in the environment of the user of the immersive system that is external to the display interface has changed,
wherein providing the visual indication comprises providing a video overlay within the visual display that depicts captured video input, and
wherein determining that the number of occupants in the environment of the user of the immersive system that is external to the display interface has changed comprises detecting that a number of attempts to establish a connection to a network gateway associated with the environment of the user of the immersive system that is external to the display interface has changed.

2. The system of claim 1, wherein detecting the second event comprises receiving the captured video input that is captured from the environment of the user of the immersive system that is external to the display interface,
wherein determining that the second event matches the defined pattern comprises determining that the captured video input corresponds to a defined video image, and
wherein providing the video overlay within the visual display that depicts the captured video input comprises providing the video overlay of the captured video input received as part of the detecting the second event.

3. The system of claim 1, wherein determining that the number of occupants in the environment of the user of the immersive system that is external to the display interface has changed further comprises detecting that a number of objects detected by an electronic monitoring device associated with the environment of the user of the immersive system that is external to the display interface has changed.

4. The system of claim 1, further comprising:
an immersive headset coupled to the display interface and the audio interface;
a video input device coupled to the immersive headset; and
an audio input device coupled to the immersive headset,
wherein detecting the second event comprises the processor processing input from the video input device and/or the audio input device.

5. The system of claim 1, further comprising:
an immersive headset coupled to the display interface and the audio interface;
a video input device physically remote from the immersive headset and physically remote from the user of the immersive system;
an audio input device physically remote from the immersive headset and physically remote from the user of the immersive system; and
a computer system external to the immersive headset,
wherein detecting the second event comprises the processor processing input from the video input device that is physically remote from the immersive headset and/or the audio input device that is physically remote from the immersive headset, and
wherein providing the visual indication is performed responsive to a signal provided by the computer system external to the immersive headset.

6. The system of claim 1, wherein providing the visual indication to the user of the immersive system further comprises providing the visual indication based on a determined relative importance of the second event.

7. The system of claim 6, wherein the relative importance of the second event is determined based on a spatial proximity of the second event to the user of the immersive system.

8. The system of claim 1, wherein the first event that occurs in the environment of the user of the immersive system that is external to the display interface occurs at a location that is more remote from the user of the immersive system than the second event that occurs in the environment of the user of the immersive system that is external to the display interface.

9. The system of claim 1, wherein the first event and the second event occur in a building comprising a first room that is not occupied by the user of the immersive system and a second room, different from the first room, that is occupied by the user of the immersive system,
wherein the first event occurs within the first room that is not occupied by the user of the immersive system, and
wherein the second event occurs within the second room that is occupied by the user of the immersive system.

10. The system of claim 1, wherein the defined pattern is a first defined pattern, and
wherein the operations further comprise:
responsive to determining that the first event matches a second defined pattern, providing an audio indication generated by the audio interface prior to providing the visual indication.

11. The system of claim 1, wherein the first event and the second event occur in a building having a room that is occupied by the user of the immersive system,
wherein the first event occurs in a location that is physically remote from the room, and
wherein the second event occurs within the room that is occupied by the user of the immersive system.

12. A tangible non-transitory computer readable storage medium comprising:
computer readable program code embodied in the medium that when executed by at least one processor causes the at least one processor to perform operations comprising:
detecting a first event that occurs in an environment of a user of an immersive system that is external to a display interface of the immersive system while the user is operating the immersive system;
initiating monitoring of the environment of the user of the immersive system that is external to the display interface responsive to detecting the first event;
detecting a second event that occurs in the environment of the user of the immersive system that is external to the display interface while monitoring the environment of the user of the immersive system that is external to the display interface; and
responsive to determining that the second event matches a defined pattern, providing an indication to the user of the immersive system so that the user is alerted,
wherein detecting the first event comprises determining that a number of occupants in addition to the user in the environment of the user of the immersive system that is external to the display interface has changed by detecting that a number of attempts to establish a connection to a network gateway associated with the environment of the user of the immersive system has changed.

13. The tangible non-transitory computer readable storage medium of claim 12, wherein detecting the second event comprises receiving video input captured from the environment of the user of the immersive system that is external to the immersive system, and
wherein determining that the second event matches the defined pattern comprises determining that the captured video input corresponds to a defined video image.

14. The tangible non-transitory computer readable storage medium of claim 12, wherein providing the indication to the user of the immersive system comprises providing the indication based on a determined relative importance of the second event.

15. The tangible non-transitory computer readable storage medium of claim 12, wherein the indication comprises a visual indication within a visual display generated by the display interface of the immersive system, and
wherein providing the visual indication comprises providing a video overlay within the visual display that depicts captured video input.

16. The tangible non-transitory computer readable storage medium of claim 12, wherein detecting that the number of attempts to establish the connection to the network gateway associated with the environment of the user of the immersive system has changed comprises detecting that a number of personal electronic devices that have unsuccessfully attempted to establish a network connection with the network gateway has changed.

17. The tangible non-transitory computer readable storage medium of claim 12, wherein the first event and the second event occur in a building having a room that is occupied by the user of the immersive system,
wherein the first event occurs in a location that is physically remote from the room, and
wherein the second event occurs within the room that is occupied by the user of the immersive system.

18. A method for alerting a user of an immersive system comprising:
detecting a first event that occurs in an environment of a user of the immersive system that is external to a display interface of the immersive system while the user is operating the immersive system;
initiating monitoring of the environment of the user of the immersive system that is external to the display interface responsive to detecting the first event;
detecting a second event that occurs in the environment of the user of the immersive system that is external to the display interface while monitoring the environment of the user of the immersive system that is external to the display interface; and
responsive to determining that the second event matches a defined pattern,
providing an indication to the user of the immersive system so that the user is alerted,
wherein the first event and the second event occur in a building having a first room that is not occupied by the user of the immersive system and a second room, different from the first room, that is occupied by the user of the immersive system,
wherein the first event occurs within the first room that is not occupied by the user of the immersive system,
wherein the second event occurs within the second room that is occupied by the user of the immersive system;
wherein detecting the first event comprises determining that a number of occupants in addition to the user of the immersive system in the environment of the user of the immersive system that is external to the display interface has changed, and
wherein determining that the number of occupants in the environment of the user of the immersive system that is external to the display interface has changed further comprises detecting that a number of personal electronic devices that have unsuccessfully attempted to establish a network connection with a network gateway associated with the environment of the user of the immersive system that is external to the display interface has changed.

19. The method of claim 18, wherein the indication comprises a visual indication within a visual display generated by the display interface of the immersive system.

20. The method of claim 19, wherein providing the visual indication comprises providing a video overlay within the visual display that depicts captured video input.

21. The method of claim 18, wherein providing the indication to the user of the immersive system comprises providing the indication based on a determined relative importance of the second event.

22. The method of claim 18, wherein detecting the second event comprises receiving video input captured from the environment of the user of the immersive system that is external to the display interface, and
wherein determining that the second event matches the defined pattern comprises determining that the captured video input corresponds to a defined video image.

* * * * *